United States Patent
Jeon et al.

(10) Patent No.: US 12,231,190 B2
(45) Date of Patent: Feb. 18, 2025

(54) APPARATUS AND METHOD FOR WIRELESS COMMUNICATION BASED ON ENHANCED NULL DATA PACKET ANNOUNCEMENT

(71) Applicant: SAMSUNG ELECTRONICS CO., LTD., Suwon-si (KR)

(72) Inventors: Eunsung Jeon, Seoul (KR); Myeongjin Kim, Seongnam-si (KR); Wookbong Lee, San Jose, CA (US); Chulho Chung, Yongin-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 17/358,386

(22) Filed: Jun. 25, 2021

(65) Prior Publication Data

US 2021/0409078 A1 Dec. 30, 2021

Related U.S. Application Data

(60) Provisional application No. 63/072,389, filed on Aug. 31, 2020, provisional application No. 63/068,100, (Continued)

(30) Foreign Application Priority Data

Oct. 26, 2020 (KR) .................. 10-2020-0139752
Mar. 5, 2021 (KR) .................. 10-2021-0029642

(51) Int. Cl.
*H04L 5/00* (2006.01)
*H04B 7/0417* (2017.01)
(Continued)

(52) U.S. Cl.
CPC ........ *H04B 7/0417* (2013.01); *H04B 7/0452* (2013.01); *H04B 7/0617* (2013.01); *H04W 80/02* (2013.01); *H04W 84/12* (2013.01)

(58) Field of Classification Search
None
See application file for complete search history.

(56) References Cited

U.S. PATENT DOCUMENTS 9,252,991 B2   2/2016  Zhang
9,960,824 B2   5/2018  Hedayat et al.
(Continued)

FOREIGN PATENT DOCUMENTS

WO      2018222177      12/2018

OTHER PUBLICATIONS

EESR Issue Date: Nov. 19, 2021 in corresponding Application No. EP Patent Application No. 21182153.3.
(Continued)

*Primary Examiner* — Sithu Ko
(74) *Attorney, Agent, or Firm* — F. Chau & Associates, LLC

(57) ABSTRACT

A method of a first device communicating with at least one second device in a wireless local area network (WLAN) system includes the first device generating a null data packet announcement (NDPA) frame and transmitting the NDPA frame to the at least one second device. The generating of the NDPA frame includes identifying a protocol version of the at least one second device and the NDPA frame includes an NDPA version subfield generated based on the protocol version.

17 Claims, 39 Drawing Sheets

Related U.S. Application Data filed on Aug. 20, 2020, provisional application No. 63/045,403, filed on Jun. 29, 2020.

(51) Int. Cl.
| | |
|---|---|
| *H04B 7/0452* | (2017.01) |
| *H04B 7/06* | (2006.01) |
| *H04W 72/04* | (2023.01) |
| *H04W 80/02* | (2009.01) |
| *H04W 84/12* | (2009.01) |

(56) References Cited

U.S. PATENT DOCUMENTS

| | | | | |
|---|---|---|---|---|
| 9,973,314 | B2* | 5/2018 | Wentink | H04L 5/005 |
| 10,070,418 | B2* | 9/2018 | Liu | H04L 5/0023 |
| 10,111,132 | B2 | 10/2018 | Merlin et al. | |
| 10,349,388 | B2 | 7/2019 | Chun et al. | |
| 10,383,092 | B2 | 8/2019 | Vermani et al. | |
| 10,448,378 | B2 | 10/2019 | Seok | |
| 10,505,595 | B2 | 12/2019 | Hedayat et al. | |
| 10,517,006 | B2 | 12/2019 | Merlin et al. | |
| 10,548,146 | B2 | 1/2020 | Chun et al. | |
| 11,778,594 | B2* | 10/2023 | Dakshinkar | H04L 45/74 370/329 |
| 11,990,966 | B2* | 5/2024 | Yu | H04B 7/063 |
| 2016/0204960 | A1* | 7/2016 | Yu | H04B 7/0417 370/338 |
| 2016/0262050 | A1* | 9/2016 | Merlin | H04L 1/0026 |
| 2016/0330732 | A1* | 11/2016 | Moon | H04B 7/0639 |
| 2017/0033898 | A1* | 2/2017 | Chun | H04B 7/0417 |
| 2017/0054542 | A1 | 2/2017 | Vermani et al. | |
| 2017/0070914 | A1* | 3/2017 | Chun | H04L 1/0075 |
| 2017/0079027 | A1* | 3/2017 | Chun | H04W 72/51 |
| 2017/0171878 | A1* | 6/2017 | Chun | H04B 7/0452 |
| 2017/0180174 | A1* | 6/2017 | Park | H04L 5/0064 |
| 2017/0245306 | A1 | 8/2017 | Kim et al. | |
| 2018/0176918 | A1 | 6/2018 | Hedayat | |
| 2018/0292518 | A1* | 10/2018 | Chu | H04W 72/121 |
| 2018/0310330 | A1* | 10/2018 | Chun | H04L 5/0053 |
| 2018/0317128 | A1* | 11/2018 | Chun | H04L 5/0055 |
| 2018/0343096 | A1* | 11/2018 | Kim | H04L 27/2602 |
| 2019/0098497 | A1* | 3/2019 | Shapira | H04L 9/0875 |
| 2019/0115970 | A1 | 4/2019 | Vermani et al. | |
| 2019/0215037 | A1* | 7/2019 | Seok | H04L 5/00 |
| 2019/0261369 | A1* | 8/2019 | Verma | H04L 5/0048 |
| 2019/0341988 | A1 | 11/2019 | Schelstraete et al. | |
| 2019/0342885 | A1* | 11/2019 | Chun | H04W 4/70 |
| 2019/0349067 | A1 | 11/2019 | Huang et al. | |
| 2019/0364560 | A1 | 11/2019 | Chun et al. | |
| 2020/0068655 | A1* | 2/2020 | Ghosh | H04W 84/12 |
| 2020/0112350 | A1 | 4/2020 | Yang et al. | |
| 2020/0137734 | A1 | 4/2020 | Chun et al. | |

OTHER PUBLICATIONS

Edward Au, 802.11-20/0566r23, Compendium of straw polls and potential changes to the Specification Framework Document, May 2020.

IEEE P802.11ax™/D6.1, Part 11: Wireless LAN Medium Access Control (MAC) and Physical Layer (PHY) Specifications, May 2020.

IEEE P802.11™-2016, Part 11: Wireless LAN Medium Access Control (MAC) and Physical Layer (PHY) Specifications, IEEE Std 802.11™-2016 (Revision of IEEE Std 802.11-2012) Jun. 2016.

Hanqing Lou et al., 802.11-19/0828r4, Feedback Overhead Analysis for 16 Spatial Stream MIMO, May 9, 2019.

Myeongjin Kim, et al., 802.11-20/0828r0, RU Allocation Subfield Design for EHT Trigger Frame, May 26, 2020.

\* cited by examiner

FIG. 6

| RU type | RU index and subcarrier range | | | | |
|---|---|---|---|---|---|
| 26-tone RU | RU 1 [-121:-96] | RU 2 [-95:-70] | RU 3 [-68:-43] | RU 4 [-42:-17] | RU 5 [-16:-4, 4:16] |
| | RU 6 [17: 42] | RU 7 [43: 68] | RU 8 [70: 95] | RU 9 [96: 121] | |
| 52-tone RU | RU 1 [-121:-70] | RU 2 [-68:-17] | RU 3 [17: 68] | RU 4 [70: 121] | |
| 106-tone RU | RU 1 [-122:-17] | | RU 2 [17: 122] | | |
| 242-tone RU | RU 1 [-122: -2, 2:122] | | | | |

The subcarrier index of 0 corresponds to the DC tone. Negative subcarrier indices correspond to subcarriers with frequency lower than the DC tone, and positive subcarrier indices correspond to subcarriers with frequency higher than the DC tone. RU 5 is the middle 26-tone RU.

FIG. 7

| RU Index | 20 MHz | | 40 MHz | | 80 MHz | | 160 MHz | | 80+80 MHz | |
|---|---|---|---|---|---|---|---|---|---|---|
| | S | E | S | E | S | E | S | E | S | E |
| 0 | -122 | -84 | -244 | -212 | -500 | -468 | -1012 | -980 | -500(L) | -468(L) |
| 1 | -100 | -68 | -228 | -180 | -484 | -436 | -996 | -948 | -484(L) | -436(L) |
| 2 | -68 | -36 | -196 | -164 | -452 | -420 | -964 | -932 | -452(L) | -420(L) |
| 3 | -52 | -4 | -164 | -132 | -420 | -388 | -932 | -900 | -420(L) | -388(L) |
| 4 | -20 | 20 | -148 | -100 | -404 | -356 | -916 | -868 | -404(L) | -356(L) |
| 5 | 4 | 52 | -116 | -84 | -372 | -340 | -884 | -852 | -372(L) | -340(L) |
| 6 | 36 | 68 | -84 | -52 | -340 | -308 | -852 | -820 | -340(L) | -308(L) |
| 7 | 68 | 100 | -68 | -20 | -324 | -276 | -836 | -788 | -324(L) | -276(L) |
| 8 | 84 | 122 | -36 | -4 | -292 | -260 | -804 | -772 | -292(L) | -260(L) |
| ⋮ | | | | | | | | | | |
| 67 | | | | | | | 820 | 852 | 308(H) | 340(H) |
| 68 | | | | | | | 852 | 884 | 340(H) | 372(H) |
| 69 | | | | | | | 868 | 916 | 356(H) | 404(H) |
| 70 | | | | | | | 900 | 932 | 388(H) | 420(H) |
| 71 | | | | | | | 932 | 964 | 420(H) | 452(H) |
| 72 | | | | | | | 948 | 996 | 436(H) | 484(H) |
| 73 | | | | | | | 980 | 1012 | 468(H) | 500(H) |

NOTE 1—S denotes subcarrier index scidx(0), identified by the RU Start Index subfield; E denotes subcarrier index scidx(Ns − 1), identified by the RU End Index subfield.

NOTE 2—x(L) denotes subcarrier index x in the frequency segment lower in frequency, and x(H) denotes subcarrier index x in the frequency segment higher in frequency.

FIG. 8B

|  | Partial BW Info ||
|  | RU Start Index | RU End Index |
| STA Info 1 | 0 | 111 |
| STA Info 2 | 18 | 35 |

FIG. 11B

|  | Partial BW Info #1 | | Partial BW Info #2 | |
| --- | --- | --- | --- | --- |
|  | S | E | S | E |
| STA Info 1 | 0 | 17 | 36 | 111 |
| STA Info 2 | 18 | 35 | – | – |

FIG. 13

| | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| 26-tone | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
| 52-tone | 37 | | 38 | | 39 | | 40 | | 41 | | 42 | | 43 | | 44 | | 45 | | 46 | | 47 | | 48 | | 49 | | 50 | | 51 | | 52 |
| 106-tone | 53 | | | | 54 | | | | 55 | | | | 56 | | | | 57 | | | | 58 | | | | 59 | | | | 60 |
| 242-tone | 61 | | | | | | | | 62 | | | | | | | | 63 | | | | | | | | 64 |
| 484-tone | 65 | | | | | | | | | | | | | | | | 66 |
| 996-tone | 67 |

FIG. 14

| B7-B1 of the RU Allocation subfield | BW information | RU size | RU Index | S | E |
|---|---|---|---|---|---|
| 0 | 20MHz | 26-tone | 1 | -122 | -84 |
| 1 | | | 2 | -100 | -68 |
| 2 | | | 3 | -68 | -36 |
| 3 | | | 4 | -52 | -4 |
| 4 | | | 5 | -20 | 20 |
| 5 | | | 6 | 4 | 52 |
| 6 | | | 7 | 36 | 68 |
| 7 | | | 8 | 68 | 100 |
| 8 | | | 9 | 84 | 122 |
| 37 | | 52-tone | 1 | -122 | -68 |
| 38 | | | 2 | -68 | -4 |
| 39 | | | 3 | 4 | 68 |
| 40 | | | 4 | 68 | 122 |
| 53 | | 106-tone | 1 | -122 | -4 |
| 54 | | | 2 | 4 | 122 |
| 61 | | 242-tone | 1 | -122 | 122 |

FIG. 15

| B7-B1 of the RU Allocation subfield | BW information | RU size | RU Index | S | E |
|---|---|---|---|---|---|
| 0 | 40MHz | 26-tone | 1 | -244 | -212 |
| 1 | | | 2 | -228 | -180 |
| 2 | | | 3 | -196 | -164 |
| 3 | | | 4 | -164 | -132 |
| 4 | | | 5 | -148 | -100 |
| 5 | | | 6 | -116 | -84 |
| 6 | | | 7 | -84 | -52 |
| 7 | | | 8 | -68 | -20 |
| 8 | | | 9 | -36 | -4 |
| 9 | | | 10 | 4 | 36 |
| 10 | | | 11 | 20 | 68 |
| 11 | | | 12 | 52 | 84 |
| 12 | | | 13 | 84 | 116 |
| 13 | | | 14 | 100 | 148 |
| 14 | | | 15 | 132 | 164 |
| 15 | | | 16 | 164 | 196 |
| 16 | | | 17 | 180 | 228 |
| 17 | | | 18 | 212 | 244 |
| 37 | | 52-tone | 1 | -244 | -180 |
| 38 | | | 2 | -196 | -100 |
| 39 | | | 3 | -148 | -52 |
| 40 | | | 4 | -68 | -4 |
| 41 | | | 5 | 4 | 68 |
| 42 | | | 6 | 52 | 148 |
| 43 | | | 7 | 100 | 196 |
| 44 | | | 8 | 180 | 244 |
| 53 | | 106-tone | 1 | -244 | -100 |
| 54 | | | 2 | -148 | -4 |
| 55 | | | 3 | 4 | 148 |
| 56 | | | 4 | 100 | 244 |
| 61 | | 242-tone | 1 | -244 | -4 |
| 62 | | | 2 | 4 | 244 |
| 65 | | 484-tone | 1 | 244 | 244 |

FIG. 16A

| B7-B1 of the RU Allocation subfield | BW information | RU size | RU Index | S | E |
|---|---|---|---|---|---|
| 0 | 80MHz | 26-tone | 1 | -500 | -468 |
| 1 | | | 2 | -484 | -436 |
| 2 | | | 3 | -452 | -420 |
| 3 | | | 4 | -420 | -388 |
| 4 | | | 5 | -404 | -356 |
| 5 | | | 6 | -372 | -340 |
| 6 | | | 7 | -340 | -308 |
| 7 | | | 8 | -324 | -276 |
| 8 | | | 9 | -292 | -260 |
| 9 | | | 10 | -260 | -228 |
| 10 | | | 11 | -244 | -196 |
| 11 | | | 12 | -212 | -164 |
| 12 | | | 13 | -180 | -148 |
| 13 | | | 14 | -164 | -116 |
| 14 | | | 15 | -132 | -84 |
| 15 | | | 16 | -100 | -68 |
| 16 | | | 17 | -84 | -36 |
| 17 | | | 18 | -52 | -4 |
| 18 | | | 19 | -20 | 20 |
| 19 | | | 20 | 4 | 52 |
| 20 | | | 21 | 36 | 84 |
| 21 | | | 22 | 68 | 100 |
| 22 | | | 23 | 84 | 132 |
| 23 | | | 24 | 116 | 164 |
| 24 | | | 25 | 148 | 180 |
| 25 | | | 26 | 164 | 212 |
| 26 | | | 27 | 196 | 244 |
| 27 | | | 28 | 228 | 260 |
| 28 | | | 29 | 260 | 292 |
| 29 | | | 30 | 276 | 324 |
| 30 | | | 31 | 308 | 340 |
| 31 | | | 32 | 340 | 372 |
| 32 | | | 33 | 356 | 404 |
| 33 | | | 34 | 388 | 420 |
| 34 | | | 35 | 420 | 452 |
| 35 | | | 36 | 436 | 484 |
| 36 | | | 37 | 468 | 500 |

FIG. 16B

| B7-B1 of the RU Allocation subfield | BW information | RU size | RU Index | S | E |
|---|---|---|---|---|---|
| 37 | 80MHz | 52-tone | 1 | -500 | -436 |
| 38 | | | 2 | -452 | -356 |
| 39 | | | 3 | -404 | -308 |
| 40 | | | 4 | -324 | -260 |
| 41 | | | 5 | -260 | -196 |
| 42 | | | 6 | -212 | -116 |
| 43 | | | 7 | -164 | -68 |
| 44 | | | 8 | -84 | 20 |
| 45 | | | 9 | -20 | 84 |
| 46 | | | 10 | 68 | 164 |
| 47 | | | 11 | 116 | 212 |
| 48 | | | 12 | 196 | 260 |
| 49 | | | 13 | 260 | 324 |
| 50 | | | 14 | 308 | 404 |
| 51 | | | 15 | 356 | 452 |
| 52 | | | 16 | 436 | 500 |
| 53 | | 106-tone | 1 | -500 | -356 |
| 54 | | | 2 | -404 | -260 |
| 55 | | | 3 | -260 | -116 |
| 56 | | | 4 | -164 | 20 |
| 57 | | | 5 | -20 | 164 |
| 58 | | | 6 | 116 | 260 |
| 59 | | | 7 | 260 | 404 |
| 60 | | | 8 | 356 | 500 |
| 61 | | 242-tone | 1 | -500 | -260 |
| 62 | | | 2 | -260 | 20 |
| 63 | | | 3 | -20 | 260 |
| 64 | | | 4 | 260 | 500 |
| 65 | | 484-tone | 1 | -500 | -20 |
| 66 | | | 2 | -20 | 500 |
| 67 | | 996-tone | 1 | -500 | 500 |

FIG. 17B

|  | RU allocation subfield [X8-X0] |
|---|---|
| STA Info 1 | 001010111 |
| STA Info 2 | 001000001 |

FIG. 18

| Nc Index | Nr Index | BW | Grouping | Codebook Information | Feedback Type | Remaining Feedback Segments | First Feedback Segment |
|---|---|---|---|---|---|---|---|
| 3 | 3 | 2 | 1 | 1 | 2 | 3 | 1 |

Bits:

| RU Start Index | RU End Index | Sounding Dialog Token Number | Disallowed Subchannel Bitmap Present | 2nd RU Start-End Index Present | Reserved | Disallowed Subchannel Bitmap | 2nd RU Start Index | 2nd RU End Index | Reserved |
|---|---|---|---|---|---|---|---|---|---|
| 8 | 8 | 6 | 1 | 1 | 2 | 16 | 8 | 8 | TBD |

Bits:

FIG. 19

| Nc Index | Nr Index | BW | Grouping | Codebook Information | Feedback Type | Remaining Feedback Segments | First Feedback Segment |
|---|---|---|---|---|---|---|---|
| 3 | 3 | 2 | 1 | 1 | 2 | 3 | 1 |

Bits:

| RU Allocation | Sounding Dialog Token Number | Disallowed Subchannel Bitmap Present | Reserved | Disallowed Subchannel Bitmap | Reserved |
|---|---|---|---|---|---|
| 9 | 6 | 1 | 2 | 16 | TBD |

Bits:

FIG. 20

| Ranging | HE/VHT | Description |
|---|---|---|
| 0 | 0 | VHT NDPA |
| 0 | 1 | HE NDPA |
| 1 | 0 | Ranging NDPA |
| 1 | 1 | EHT NDPA |

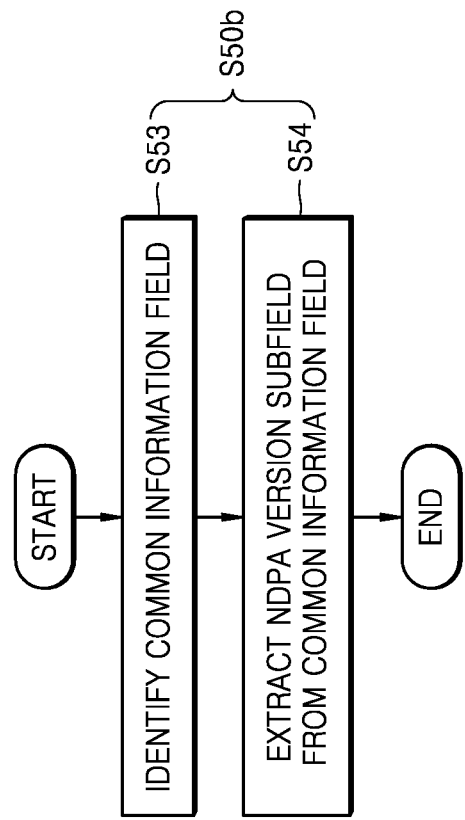

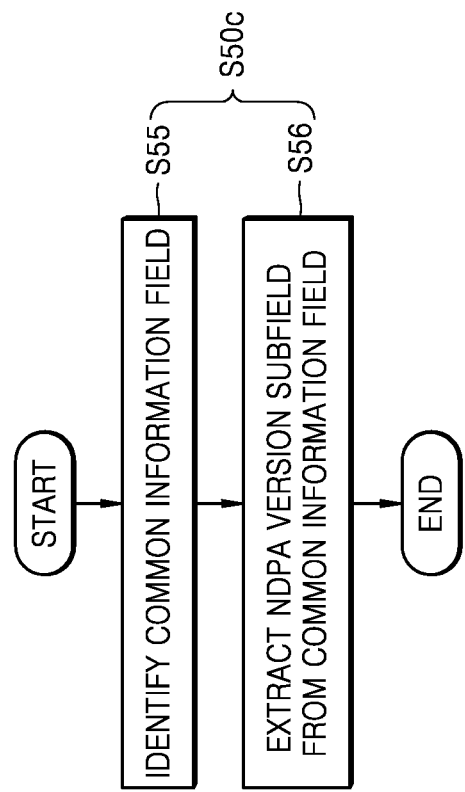

APPARATUS AND METHOD FOR WIRELESS COMMUNICATION BASED ON ENHANCED NULL DATA PACKET ANNOUNCEMENT

CROSS-REFERENCE TO RELATED APPLICATIONS

This non-provisional U.S. Patent application claims priority under 35 U. S. C. § 119 to provisional U.S. Patent Application No. 63/045,403 filed on Jun. 29, 2020, provisional U.S. patent Application No. 63/068,100 filed on Aug. 20, 2020, provisional U.S. Patent Application No. 63/072,389 filed on Aug. 31, 2020, Korean Patent Application No. 10-2020-0139752 filed on Oct. 26, 2020 and Korean Patent Application No. 10-2021-0029642 filed on Mar. 5, 2021, in the Korean Intellectual Property Office, the disclosures of which are incorporated by reference in their entireties herein.

1. TECHNICAL FIELD

The inventive concept relates to wireless communication, and more particularly, to an apparatus and a method for wireless communication based on an enhanced null data packet announcement (NDPA).

2. DISCUSSION OF RELATED ART

A wireless local area network (WLAN) is a wireless technology that enables two or more apparatuses to communicate with one another using wireless signals. Most current WLAN technologies are based on the institute of electrical and electronics engineers (IEEE) 802.11 standard. The 802.11 standard developed into 802.11b, 802.11a, 802.11g, 802.11n, 802.11ac, and 802.11ax and may support a transmission speed up to 1 gigabyte per second (Gbyte/s) by using orthogonal frequency-division multiplexing (OFDM) technology.

In the 802.11ac standard, data may be simultaneously transmitted to a plurality of users through a multi-user multi-input multi-output (MU-MIMO) technique. However, reception performance deteriorates in a dense area of users when the 802.11ac standard is applied.

The 802.11ax (referred to as high efficiency (HE)) standard can handle dense user areas by applying an orthogonal frequency-division multiple access (OFDMA) technology as well as the MU-MIMO technique. Therefore, a WLAN system to which the 802.11ax is applied may effectively support communication in a dense area and outdoors.

Furthermore, in the 802.11be (referred to as extremely high throughput (EHT)) standard, an unlicensed spectrum of 6 gigahertz (GHz) is supported, a bandwidth of up to 320 megahertz (MHz) is utilized per channel, hybrid automatic repeat and request (HARD) is provided, and Multiple Input Multiple Output (MIMO) of up to 16×16 is supported. Therefore, a next generation WLAN system is expected to effectively support low latency and ultrahigh speed transmission like new radio (NR) that is 5th generation (5G) technology.

SUMMARY

At least one embodiment of the inventive concept relates to an apparatus and a method for supporting efficient channel state information feedback of a user in a wireless local area network (WLAN) system.

According to an embodiment of the inventive concept, there is provided a method of a first device communicating with at least one second device in a wireless local area network (WLAN) system. The method includes the first device generating a null data packet announcement (NDPA) frame and transmitting the NDPA frame to the at least one second device. The generating of the NDPA frame includes identifying a protocol version of the at least one second device and the NDPA frame includes an NDPA version subfield generated based on the protocol version.

According to an embodiment of the inventive concept, there is provided a first device configured to communicate with at least one second device in a wireless local area network (WLAN). The first device includes a radio frequency integrated circuit (RFIC) and a baseband circuit. The baseband circuit is for generating a null data packet announcement (NDPA) frame. The baseband circuit also provides the NDPA frame to the at least one second device through the RFIC. The baseband circuit additionally identifies a protocol version of the at least one second device and the NDPA frame includes an NDPA version subfield generated based on the protocol version.

According to an embodiment of the inventive concept, there is provided a method of a second device communicating with a first device in a wireless local area network (WLAN) system. The method includes: the second device receiving a null data packet announcement (NDPA) frame from the first device; the second device extracting an NDPA version subfield from the NDPA frame; the second device identifying a protocol version based on the NDPA version subfield; and the second device decoding the NDPA frame based on the protocol version.

According to an embodiment of the inventive concept, there is provided a baseband circuit provided in a transmission device of a wireless local area network (WLAN) system. The baseband circuit includes a storage device, a controller, and a signal processor. The controller is for writing data to the storage device or reading data from the storage device. The signal processor is controlled by the controller and generates a physical layer protocol data unit (PPDU) including a preamble and payload. A data field of the payload includes a null data packet announcement (NDPA) frame. The NDPA frame includes a medium access control (MAC) header and a frame body. The frame body includes a first user information field applied to a receiving device to receive the PPDU from the transmission device. The first user information field includes a partial bandwidth information subfield including subcarrier index information corresponding to a partial bandwidth designated as a channel feedback section of the receiving device and an additional partial bandwidth presence subfield indicating whether an additional partial bandwidth designated as the channel feedback section of the receiving device is provided in a bandwidth other than the partial bandwidth.

According to an embodiment of the inventive concept, there is provided a baseband circuit provided in a transmission device of a WLAN system. The baseband circuit includes a storage device, a controller, and a signal processor. The controller is for writing data to the storage device or reading data from the storage device. The signal processor is controlled by the controller and generates a physical layer protocol data unit (PPDU) including a preamble and payload. A data field of the payload includes a null data packet announcement (NDPA) frame. The NDPA frame includes a medium access control (MAC) header and a frame body. The frame body includes a first user information field applied to a receiving device to receive the PPDU from the transmission device. The user information field includes a resource unit (RU) allocation subfield including index information of an RU designated as the channel feedback section of the receiving device.

According to an embodiment of the inventive concept, there is provided a baseband circuit provided in a receiving device of a wireless local area network (WLAN) system. The baseband circuit includes a storage device, a controller, and a signal processor. The controller is for writing data the storage device or reading data from the storage device. The signal processor is controlled by the controller and is for decoding a physical layer protocol data unit (PPDU) received from a transmission device. The PPDU includes a preamble and payload. A data field of the payload includes a null data packet announcement (NDPA) frame. The NDPA frame includes a medium access control (MAC) header and a frame body. The frame body includes a user information field identifying the receiving device. The user information field includes a partial bandwidth information subfield including subcarrier index information corresponding to a partial bandwidth designated as a channel feedback section of the receiving device and an additional partial bandwidth presence subfield indicating whether an additional partial bandwidth designated as a channel feedback section of the receiving device is provided in the frame body other than the partial bandwidth.

According to an embodiment of the inventive concept, there is provided a baseband circuit provided in a receiving device of a wireless local area network (WLAN) system. The baseband circuit includes a storage device, a controller, and a signal processor. The controller is for writing data to the storage device or reading data from the storage device. The signal processor is controlled by the controller and decodes a physical layer protocol data unit (PPDU) received from a transmission device. The PPDU includes a preamble and payload. A data field of the payload includes a null data packet announcement (NDPA) frame. The NDPA frame includes a medium access control (MAC) header and a frame body. The frame body includes a user information field applied to the receiving device. The user information field includes a resource unit (RU) allocation subfield including index information of an RU designated as the channel feedback section of the receiving device.

BRIEF DESCRIPTION OF THE DRAWINGS

Embodiments of the inventive concept will be more clearly understood from the following detailed description taken in conjunction with the accompanying drawings in which:

FIG. 6 is a table illustrating an example of a subcarrier index range in accordance with a resource unit (RU) index;

FIG. 7 is a table illustrating an example of a subcarrier index by bandwidth in accordance with an RU index;

FIGS. 8A and 8B are views illustrating a feedback section setting example when a partial bandwidth feedback method of the 802.11ax standard is applied in a multiple RU allocation environment;

FIGS. 11A and 11B are views illustrating a feedback section setting example when the partial bandwidth feedback method illustrated in FIGS. 9 and 10 is applied in a multiple RU allocation environment;

FIG. 13 is a view illustrating an example of an RU position in accordance with a value of an RU Allocation subfield;

FIG. 14 is a table illustrating an example of a subcarrier index in accordance with a value of an RU Allocation subfield in a bandwidth of 20 MHz;

FIG. 15 is a table illustrating an example of a subcarrier index in accordance with a value of an RU Allocation subfield in a bandwidth of 40 MHz;

FIGS. 16A and 16B are tables illustrating an example of a subcarrier index in accordance with a value of an RU Allocation subfield in a bandwidth of 80 MHz;

FIGS. 17A and 17B are views illustrating a feedback section setting example when the partial bandwidth feedback method illustrated in FIG. 12 is applied in a multiple RU allocation environment;

FIG. 18 is a view illustrating an example of an MIMO control field in a compressed beamforming frame according to an embodiment of the inventive concept;

FIG. 19 is a view illustrating another example of an MIMO control field in a compressed beamforming frame according to an embodiment of the inventive concept;

FIG. 20 is a table illustrating values of a sounding dialog token field according to an embodiment of the inventive concept;

FIGS. 26A and 26B are flowcharts illustrating a wireless communication method based on an enhanced NDPA according to an exemplary embodiment of the inventive concept;

FIGS. 28A and 28B are flowcharts illustrating a wireless communication method based on an enhanced NDPA according to an exemplary embodiment of the inventive concept;

DETAILED DESCRIPTION OF THE EMBODIMENTS

Figure 1:
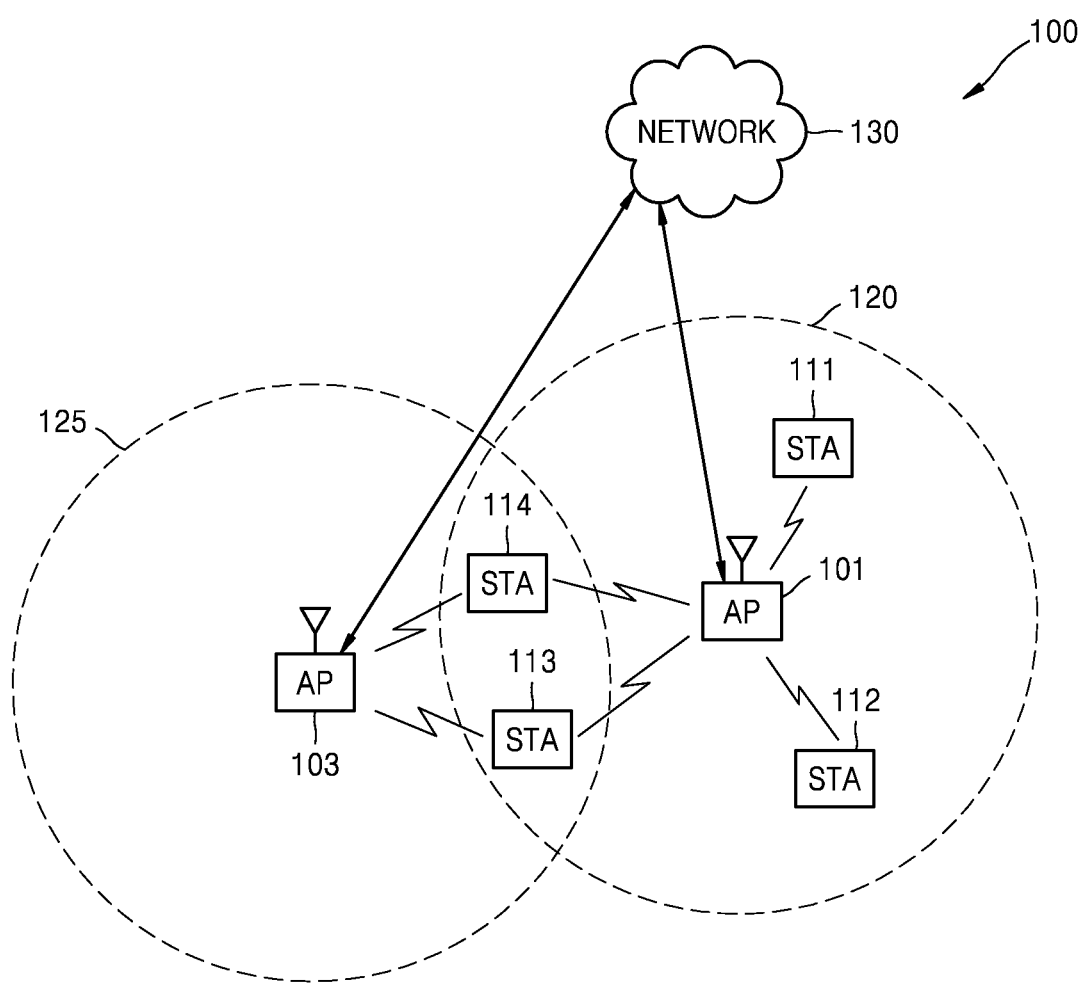
FIG. 1 is a view illustrating a wireless local area network (WLAN) system.

Hereinafter, embodiments of the inventive concept will be described in detail with reference to the accompanying drawings.

Features of the inventive concept and a method of achieving the same will be clarified with reference to embodiments described in detail with the accompanying drawings. However, the inventive concept is not limited to the embodiments described hereinafter and may be implemented in various forms. Like reference numerals refer to like elements throughout.

Herein, a singular form includes a plural form unless specially described. Described components, processes, operations and/or elements do not exclude presence or addition of one or more other components, processes, operations and/or elements.

In specifically describing the embodiments of the inventive concept, orthogonal frequency division multiplexing (OFDM) or an OFDM-based wireless communication system, in particular, the IEEE 802.11 standard is mainly described. However, the gist of the inventive concept may be slightly modified and applied to other communication systems with a similar technological background and channel type. For example, the inventive concept may be applied to a cellular communication system such as long term evolution (LTE), LTE-Advanced (LTE-A), new radio (NR), wireless broadband (WiBro), or global system for mobile communication (GSM) or a remote communication system such as Bluetooth or near field communication (NFC).

The following terms are used through the present application.

The term "connects" and derivatives thereof refer to direct or indirect communication between two or more components that physically contact or do not physically contact.

The terms "transmits", "receives", and "communicates" and derivatives thereof include all direct and indirect communication.

The term "controller" means a certain device, system, or a part thereof controlling at least one operation. The controller may be implemented by hardware or a combination of hardware and software and/or firmware. A function related to a specific controller may be locally or remotely concentrated or dispersed.

The term "at least one" means that, when a list of items is used, one or more different combinations of the items may be used and only one item in the list may be required. For example, "at least one of A, B, and C" include one of the combinations of A, B, C, and A and B, A and C, B and C, and A and B and C.

In addition, various functions described hereinafter may be implemented or supported by one or more computer programs and each of the programs is formed of computer-readable program code and is executed in a computer-readable recording medium.

The terms "application" and "program" refer to one or more computer programs, software components, instruction sets, processes, functions, objects, classes, instances, related data, or parts thereof suitable for implementation of pieces of computer-readable program code.

The term "computer-readable program code" include all types of computer code including source code, object code, and execution code.

The term "computer-readable media" includes all types of media that may be accessed by a computer such as read only memory (ROM), random access memory (RAM), a hard disk drive, a compact disk (CD), a digital video disk (DVD), and other types of memory.

The term "non-transitory computer-readable media" exclude wired, wireless, optical, or other communication links transmitting temporary electrical or other signals.

The term "non-temporary computer-readable media" includes a medium in which data may be permanently stored and a medium in which data may be stored and may be overwritten later such as a rewritable optical disk or an erasable memory device.

In various embodiments of the inventive concept described hereinafter, a hardware access method will be described as an example. However, in various embodiments of the inventive concept, because a technology using both hardware and software may be included, various embodiments of the inventive concept do not exclude a software-based access method.

In addition, a term referring to control information used in the following description, a term referring to an entry, a term referring to a network entity, a term referring to a message, and a term referring to a component of a device are illustrated for conveniences of discussion. Therefore, the inventive concept is not limited to the above-described terms and other terms having the same technological meaning may be used.

Figure 2:
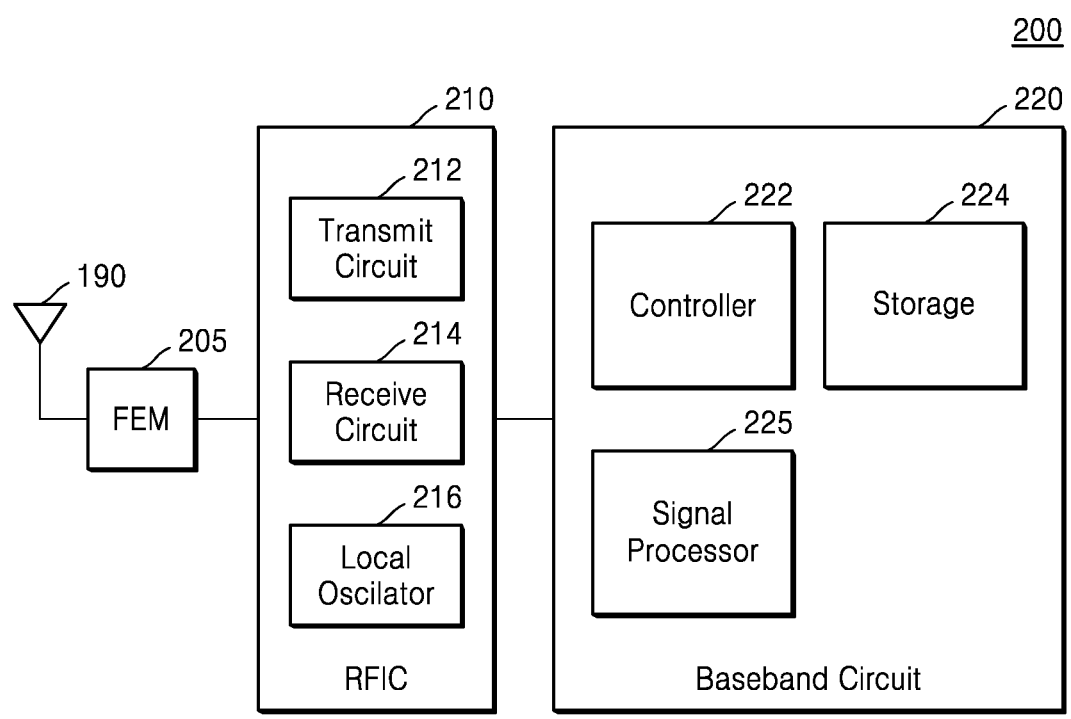
FIG. 2 is a block diagram illustrating a wireless communication device transmitting or receiving a physical layer convergence protocol (PLCP) protocol data unit (PPDU)

FIG. 1 is a view illustrating a wireless local area network (WLAN) system 100. FIG. 2 is a block diagram illustrating a wireless communication device 200 transmitting or receiving a physical layer convergence protocol (PLCP) protocol data unit (PPDU).

As illustrated in FIG. 1, the WLAN system 100 includes access points (AP) 101 and 103.

Specifically, the APs 101 and 103 may communicate with at least one network 130 such as the Internet, an internet protocol (IP) network, or another data network.

The APs 101 and 103 may provide wireless connection to the network 130 for a plurality of stations (STAs) 111, 112, 113, and 114 in coverage areas 120 and 125 thereof. The APs 101 and 103 may communicate with each other by using wireless fidelity (WiFi) or other WLAN communication technologies. The APs 101 and 103 may communicate with the STAs 111 to 114 by using the WiFi or other WLAN communication technologies. Herein, an AP may be referred to as a first device and a STA may be referred to as a second device. Accordingly, the first device may communicate with at least one second device.

For reference, in accordance with a network type, other well-known terms such as "router" and "gateway" may be used instead of "AP". In addition, in the WLAN, the AP is provided for a wireless channel. The AP may mean the STA.

In addition, in accordance with the network type, the "STA" may be used instead of other well-known terms such as "mobile station", "subscriber station", "remote terminal", "user equipment", "wireless terminal", "user device", or "user". For convenience of discussion, "STA" is used for representing a remote wireless device wirelessly connected to the AP or connected to the wireless channel in the WLAN. Herein, the STA is considered as a mobile device (e.g., a mobile telephone or a smartphone). However, the STA may be a fixed device (e.g., a desktop computer, the AP, a media player, a fixed sensor, or a television set).

Approximate extents of the coverage areas 120 and 125 are marked with dashed lines. Here, the coverage areas 120 and 125 are illustrated as being circular for convenience of discussion. However, each of the coverage areas 120 and 125 related to the APs 101 and 103 may have another shape to which a varying change in wireless environment related to a natural or artificial obstruction is reflected or another irregular shape in accordance with setting of the APs 101 and 103.

The APs 101 and 103 may include a circuitry and/or a program for managing transmission of an uplink multiuser (ULMU) or a downlink multiuser (DLMU) in the WLAN system 100.

Although FIG. 1 illustrates an example of the WLAN system 100, an embodiment of the inventive concept is not limited thereto. That is, various changes may be made to FIG. 1.

For example, the WLAN system 100 may include an arbitrary number of properly arranged APs and an arbitrary number of STAs. In addition, the AP 101 may directly communicate with an arbitrary number of STAs. The AP 101 may provide wireless broadband access to the plurality of STAs 111 to 114 via the network 130.

Similarly, each of the APs 101 and 103 may directly communicate with the network 130 and may provide wireless broadband access to the plurality of STAs 111 to 114 via the network 130. In addition, the APs 101 and 103 may be configured to connect to a varying external network such as an external telephone network or a data network.

In FIG. 2, a wireless communication device transmitting or receiving a PPDU is illustrated.

For reference, the wireless communication device 200 of FIG. 2 may be included in a transmission device (for example, an AP) or a receiving device (for example, an STA). That is, the wireless communication device 200 of FIG. 2 may be included in one of the APs 101 and 103 and the STAs 111 to 114 illustrated in FIG. 1 and may be applied to, for example, a computer, a smartphone, a portable electronic device, a tablet, a wearable device, or a sensor used for Internet of things (IoT).

In an embodiment, the wireless communication device 200 includes an antenna 190, a front-end module (FEM) 205, a radiofrequency integrated circuit (RFIC) 210, and a baseband circuit 220. In addition, although not shown in FIG. 2, the wireless communication device 200 may further include a power modulator supplying a power voltage (e.g., a dynamically variable output voltage) to a power amplifier in the RFIC 210. The power modulator may be driven in an average power tracking mode or an envelope tracking mode in order to generate and output the power voltage.

For reference, the FEM 205 and the RFIC 210 may be implemented in one chip as a single component. In this case, a function of the FEM 205 and a function of the RFIC 210 may be implemented together in one chip. For convenience sake, it is illustrated that the FEM 205 and the RFIC 210 are separate components according to an embodiment of the inventive concept.

The antenna 190 is connected to the FEM 205 and transmits a signal received from the FEM 205 to another wireless communication device (station or access point) or may provide a signal received from the wireless communication device to the FEM 205. The FEM 205 may separate a transmit frequency from a receive frequency. That is, the FEM 205 may separate a signal received from the RFIC 210 by frequency band and may provide the separated signal to the antenna 190. In addition, the FEM 205 may provide the signal received from the antenna 190 to the RFIC 210.

The antenna 190 may transmit a signal frequency divided by the FEM 205 to the outside or may provide the signal received from the outside to the FEM 205.

For reference, the antenna 190 may include, for example, an array antenna. However, the inventive concept is not limited thereto. The antenna 190 may be singular or plural. Therefore, in some embodiments, the wireless communication device 200 may support a phased array and multiple-input and multiple-output (MIMO) by using a plurality of antennas. In FIG. 2, for convenience sake, the antenna 190 is illustrated as being singular.

The FEM 205 may include an antenna tuner (not shown). The antenna tuner (not shown) may be connected to the antenna 190 and may control impedance of the antenna 190.

The RFIC 210 may generate a radiofrequency (RF) signal by performing a frequency up-conversion on a baseband signal received from the baseband circuit 220. The RFIC 210 may generate the baseband signal by performing a frequency down-conversion on the RF signal received from the FEM 205. In an embodiment, the frequency down-conversion convers the RF signal into a baseband signal including frequency components lower than the RF signal.

In an embodiment, the RFIC 210 includes a transmit circuit 212 for the frequency up-conversion, a receive circuit 214 for the frequency down-conversion, and a local oscillator 216.

For reference, although not shown in FIG. 2, the transmit circuit 212 may include a first analog baseband filter, a first mixer, and a power amplifier. The receive circuit 214 may include a second analog baseband filter, a second mixer, and a low-noise amplifier.

Here, the first analog baseband filter may filter the baseband signal received from the baseband circuit 220 and may provide the filtered baseband signal to the first mixer. The first mixer may perform the frequency up-conversion to convert a frequency of the baseband signal from a baseband into a high frequency band using a frequency signal provided by the local oscillator 216. Through the frequency up-conversion, the baseband signal may be provided to the power amplifier as the RF signal and the power amplifier may power amplify the RF signal and may provide the power amplified RF signal to the FEM 205.

A low noise amplifier may amplify the RF signal received from the FEM 205 and may provide the amplified RF signal to the second mixer. The second mixer may perform the frequency down-conversion to convert a frequency of the RF signal from the high frequency band into the baseband using the frequency signal provided by the local oscillator 216. Through the frequency down-conversion, the RF signal may be provided to the second analog baseband filter as the baseband signal and the second analog baseband filter may filter the baseband signal and may provide the filtered baseband signal to the baseband circuit 220.

On the other hand, the baseband circuit 220 may receive the baseband signal from the RFIC 210 and may process the received baseband signal or may generate the baseband signal and may provide the generated baseband signal to the RFIC 210.

In an embodiment, the baseband circuit 220 includes a controller 222, a storage 224 (e.g., a memory or storage device), and a signal processor 225.

Specifically, the controller 222 may control overall operations of the RFIC 210 as well as overall operations of the baseband circuit 220. In addition, the controller 222 may write or read data in or from the storage 224. For this purpose, the controller 222 may include at least one processor, microprocessor, or microcontroller or may be a part of the processor. Specifically, the controller 222 may include, for example, a central processing unit (CPU) and a digital signal processor (DSP).

The storage 224 may store data such as a basic program, an application program, and setting information for an operation of the wireless communication device 200. For example, the storage 224 may store instructions and/or data related to the controller 222, the signal processor 225, or the RFIC 210. In addition, the storage 224 may store data in a frame format, data in a PPDU format, and RU allocation information.

The storage 224 may include various storage media. That is, the storage 224 may include volatile memory, non-volatile memory, or a combination of volatile memory and non-volatile memory. For example that storage 224 may be random access memory (RAM) such as dynamic RAM (DRAM), phase-change RAM (PRAM), magnetic RAM (MRAM), or static RAM (SRAM) or flash memory such as NAND flash memory, NOR flash memory, or ONE NAND flash memory.

In addition, the storage 224 may store various processor-executable instructions. The processor-executable instructions may be executed by the controller 222.

The signal processor 225 may process the baseband signal received from the RFIC 210 or the baseband signal to be provided to the RFIC 210.

For convenience of discussion, the signal processor 225 will be described based on components in a receiving path.

Specifically, the signal processor 225 may include a demodulator, a receive filter and cell searcher, and other components.

The demodulator may include a channel estimator, a data deallocation unit, an interference whitener, a symbol detector, a channel state information (CSI) generator, a mobility measurement unit, an automatic gain control unit, an automatic frequency control unit, a symbol timing recovery unit, a delay spread estimation unit, and a time correlator and may perform functions of the above components.

Here, the mobility measurement unit measuring signal quality of a serving cell and/or a neighboring cell in order to support mobility may measure a received signal strength indicator (RSSI), a reference signal received power (RSRP), a reference signal received quality (RSRQ), and a reference signal (RS)-signal-to-interference & noise ratio (SINR) of a cell.

The receive filter and cell searcher may include a receive filter, a cell searcher, a fast Fourier transform (FFT) unit, a time duplex-automatic gain control (TD-AGC) unit, and a time duplex-automatic frequency control (TD-AFC) unit.

Here, the receive filter (referred to as a receive front end) may perform sampling, interference cancellation, and amplification on the baseband signal received from the RFIC 210. In an embodiment, the cell searcher includes a primary synchronization signal (PSS) detector and a secondary synchronization signal (SSS) detector and may measure a magnitude and quality of a neighboring cell signal.

The other components may include a symbol processor, a channel decoder, and components in a transmitting path.

Here, the symbol processor may perform channel-deinterleaving, demultiplexing, and rate-matching so that a demodulated signal may be decoded by channel. The channel decoder may decode the demodulated signal in units of code blocks. In addition, the symbol processor and the channel decoder may include a hybrid automatic repeat request (HARD) processing unit, a turbo decoder, a CRC checker, a Viterbi decoder, and a turbo encoder.

The components in a transmitting path may include a transmit first-in-first-out (TX FIFO), an encoder, a scrambler, an interleaver, a constellation mapper, an inversed discrete Fourier transformer (IDFT), and a guard interval and windowing insertion module.

As described above, in FIG. 2, the baseband circuit 220 is illustrated as including the controller 222, the storage 224, and the signal processor 225.

However, in an embodiment, in the baseband circuit 220, two or more of the controller 222, the storage 224, and the signal processor 225 may be integrated into one. The baseband circuit 220 may further include components other than the above-described components or omit some of these components. Furthermore, the signal processor 225 may further include components other than the above-described components or omit some of these components.

For convenience of discussion, the baseband circuit 220 is illustrated as including the above-described components.

In some embodiments, the controller 222, the storage 224, and the signal processor 225 may be included in one device. In other embodiments, the controller 222, the storage 224, and the signal processor 225 may be respectively included in different devices (for example, distributed architectures).

In addition, the RFIC 210 and the baseband circuit 220 may include parts well known to those skilled in the art as illustrated in FIG. 2. The corresponding parts may be executed by a method well known to those skilled in the art or by using hardware, firmware, software logic, or a combination of hardware, firmware, and software logic.

FIG. 2 illustrates an example of the wireless communication device and embodiments of the inventive concept are not limited thereto. That is, various changes (addition or omission of parts) may be made in FIG. 2.

Figure 3:
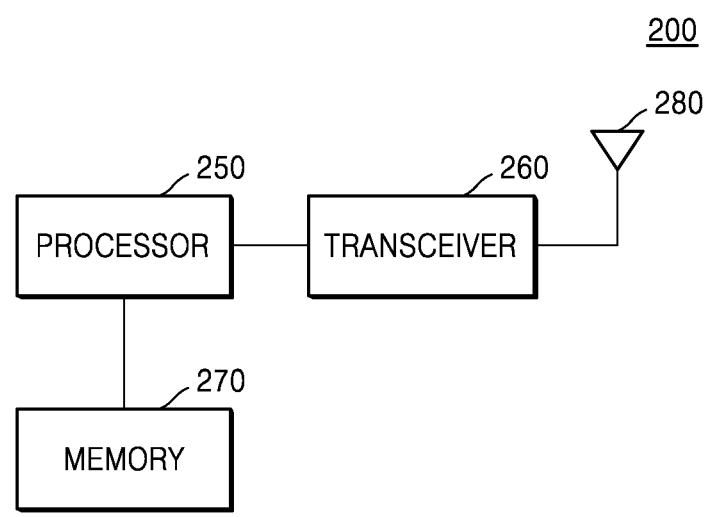
FIG. 3 is a block diagram schematically illustrating the wireless communication device of FIG. 2.

Here, referring to FIG. 3, an example in which some of the components of the wireless communication device 200 of FIG. 2 are changed (that is, simplified) is illustrated.

In an embodiment, the wireless communication device 200 of FIG. 2 includes a processor 250, a transceiver 260, memory 270, and an antenna 280 as illustrated in FIG. 3.

The processor 250 may control overall operations of the transceiver 260 and may write or read data in or from the memory 270. That is, the processor 250 may perform, for example, a function of the controller 222 of FIG. 2.

The transceiver 260 may transmit and receive a wireless signal and may be controlled by the processor 250. That is, the transceiver 260 may perform, for example, functions of the FEM 205, the RFIC 210, and the signal processor 225 of FIG. 2.

Therefore, when the wireless communication device 200 is included in the transmission device, the transceiver 260 may generate a PPDU (a physical layer protocol data unit) including a preamble and a payload and may transmit the generated PPDU to the receiving device.

On the other hand, when the wireless communication device 200 is included in the receiving device, the transceiver 260 may receive the PPDU including the preamble and the payload from the transmission device. The transceiver 260 may decode the payload based on the preamble of the received PPDU. That is, the transceiver 260 may decode the preamble of the PPDU through an internal decoder (for example, a decoder of the signal processor 225 of FIG. 2) to generate a decoding result and may decode the payload of the PPDU based on the decoding result.

The memory 270 may store data such as a basic program, an application program, and setting information for an operation of the wireless communication device 200. Therefore, the memory 270 may store instructions and/or data related to the processor 250 and the transceiver 260. That is, the memory 270 may perform, for example, a function of the storage 224 of FIG. 2.

The antenna 280 may be connected to the transceiver 260 and may transmit a signal received from the transceiver 260 to another wireless communication device (terminal or base station) or may provide a signal received from the wireless communication device to the transceiver 260. That is, the antenna 280 may perform, for example, a function of the antenna 190 of FIG. 2.

As described above, according to an embodiment of the inventive concept, because the wireless communication device 200 has the above-described characteristics and configuration, hereinafter, referring to FIGS. 4 to 7, a high efficiency null data packet announcement (HE NDPA) frame used in a channel sounding process and the IEEE 802.11ax format will be described. The channel sounding process may include evaluating the radio environment for wireless communication. Furthermore, referring to FIGS. 8A and 8B, a feedback section setting example when the partial bandwidth feedback method of the 802.11ax standard is applied in the multiple RU allocation environment will be described.

Figure 4:
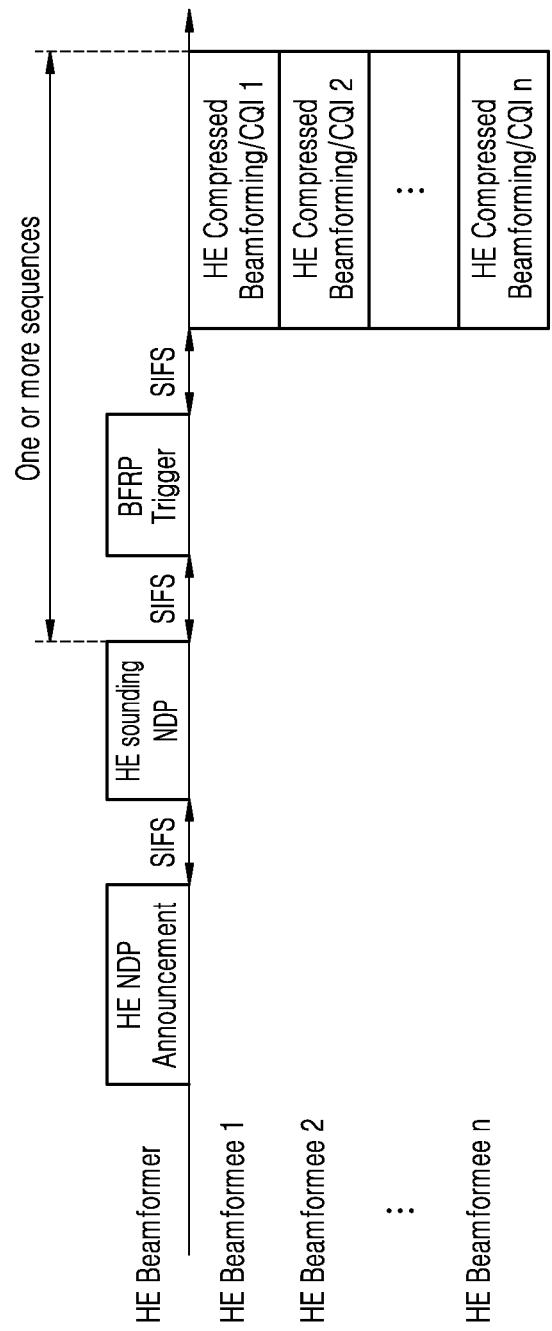
FIG. 4 is a view illustrating a channel sounding process according to an embodiment of the inventive concept.
Figure 5:
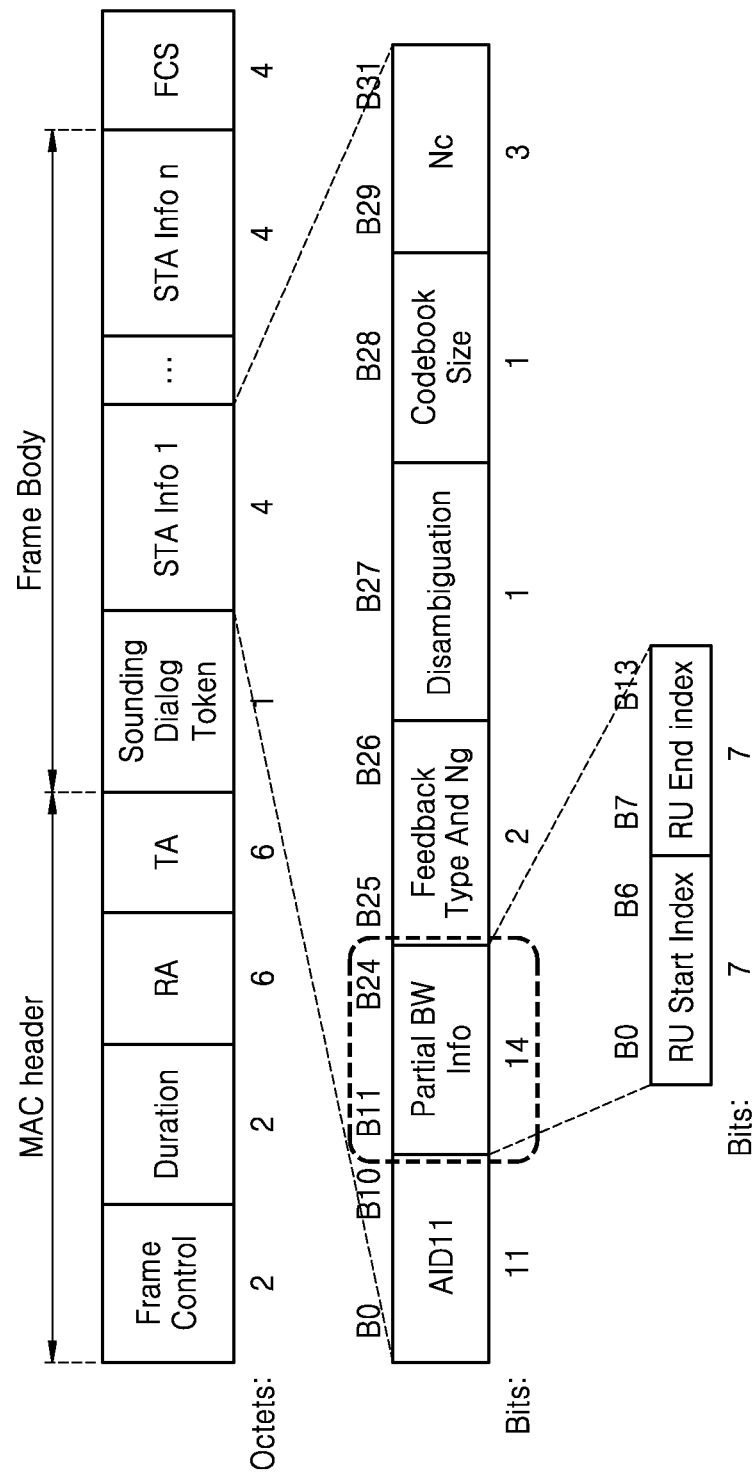
FIG. 5 is a view illustrating a structure of a null data packet announcement (NDPA) frame defined in the 802.11ax standard.
Figure 8A:
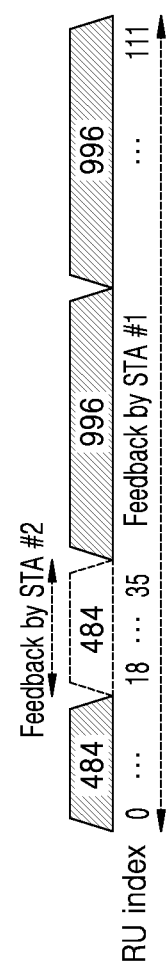

FIG. 4 is a view illustrating a channel sounding process according to an embodiment of the inventive concept. FIG. 5 is a view illustrating a structure of a null data packet announcement (NDPA) frame defined in the 802.11ax standard. FIG. 6 is a table illustrating an example of a subcarrier index range in accordance with a resource unit (RU) index. FIG. 7 is a table illustrating an example of a subcarrier index by bandwidth in accordance with an RU index. FIGS. 8A and 8B are views illustrating a feedback section setting example when a partial bandwidth feedback method of the 802.11ax standard is applied in a multiple RU allocation environment.

First, referring to FIG. 4, a process of feeding back channel state information between a Beamformer and a Beamformee based on a sounding protocol is illustrated. The Beamformer may be transmission device such as an AP. The Beamformee may be a receiving device such as a non-AP STA. The non-AP STA may become the Beamformer. However, for convenience of discussion, according to an embodiment of the inventive concept, the AP is illustrated as being the Beamformer. A device that shapes its transmitted frames may be referred to as a Beamformer, and a receiver of such frames may be referred to as a Beamformee.

For reference, the sounding protocol may mean a process of the Beamformer feeding back the channel state information from the Beamformee. In an embodiment, the channel state information may refer to channel properties of a communication link. In addition, the frame or PPDU, for example, HE NDPA, HE sounding NDP, a beamforming report poll (BFRP) Trigger, or HE Compressed Beamforming/channel quality indicator (CQI) 1 to n (n is a natural number of no less than 1) illustrated in FIG. 4 may have a structure in accordance with the IEEE 802.11ax standard.

Specifically, a method of sounding back channel state information between a HE Beamformer and a HE Beamformee based on the sounding protocol may be performed in the following order.

(1) in order to obtain channel state information of a downlink channel (e.g., a Beamformee direction link in a Beamformer), first, the HE Beamformer transmits an HE NDPA (e.g., illustrated HE NDP Announcement in FIG. 4) frame informing transmission of the HE sounding NDP (or initiating the sounding protocol) to HE Beamformees 1 to n, where n is a natural number of no less than 1.

The HE NDPA frame may be a control frame used for informing that a channel sounding process has been initiated so that the HE sounding NDP may be transmitted. That is, because the HE Beamformer transmits the HE NDPA frame before transmitting the HE sounding NDP, the HE Beamformee may prepare for feeding back the channel state information before receiving the HE sounding NDP.

In an embodiment, the HE NDPA (e.g., HE NDPA) frame may include association identifier (AID) information and feedback type information of the HE Beamformee to which the HE sounding NDP is to be transmitted. That is, in the HE NDPA frame, sounding instruction information on which station (that is, HE Beamformee) measures which downlink channel by which method may be included.

The HE Beamformees 1 to n that receive the HE NDPA frame may determine an AID12 (or AID11) subfield value included in an STA information field (hereinafter, mixed with the term of an STA Info field or a user information field) of the HE NDPA frame and may determine whether they are stations to be sounded.

In addition, the HE Beamformees 1 to n may determine their feedback orders through the order of the STA Info field included in the HE NDPA frame.

(2) The HE Beamformer may transmit the HE sounding NDP after a short interframe space (SIFS) time after transmitting the HE NDPA frame. For example, the HE sounding NDP may have a HE PPDU structure from which a data field is omitted.

That is, the HE Beamformer may transmit the HE sounding NDP instructing information on a downlink channel to be measured by each station (that is, HE Beamformee) to the HE Beamformees 1 to n.

At least one of an HE-short training field (STF) and an HE-long training field (LTF) may be included in the HE sounding NDP. The HE-STF or the HE-LTF may include the information on the downlink channel to be measured by each station (that is, HE Beamformee).

(3) The HE Beamformer may transmit a BFRP Trigger frame triggering transmission of uplinks (for reference, uplink means a Beamformer direction link in a Beamformee) of the HE Beamformees 1 to n to the HE Beamformees 1 to n after the SIFS time after the HE Beamformer transmits the HE sounding NDP.

The channel state information of the downlink channel to uplink, allocation information of uplink resources allocated to the stations (that is, the HE Beamformees 1 to n) may be included in the BFRP Trigger frame to feedback the channel state information of the downlink channel to uplink.

(4) The HE Beamformees 1 to n that receive the BFRP Trigger frame may generate feedback information to be transmitted to the HE Beamformer by obtaining the channel state information of the downlink channel based on the HE NDPA frame, the HE sounding NDP, and the BFRP Trigger frame.

That is, the HE Beamformees 1 to n may generate the HE Compressed Beamforming/CQI frames 1 to n (n is a natural number of no less than 1) including the feedback information and may transmit the generated HE Compressed Beamforming/CQI frames 1 to n to the HE beamformer.

In an embodiment, the HE Compressed Beamforming/CQI frames 1 to n include information on a signal-to-noise ratio (SNR) value of a space-time stream and a compressed beamforming feedback matrix of a subcarrier.

As described above, because the method of sounding the channel state information between the HE Beamformer and the HE Beamformee is performed based on the sounding protocol, hereinafter, an NDPA frame used for the previously described channel sounding process will be described.

Referring to FIG. 5, the HE NDPA frame may include a medium access control (MAC) header, a frame body, and a frame check sequence (FCS) field including four or more octets. Here, the MAC header may include a Frame Control field including two octets, a Duration field including two octets, a receiver address (RA) field including six octets, and a transmitter address (TA) field including six octets. In addition, the frame body may include a Sounding Dialog Token field including one octet and one or more STA information fields STA Info 1 to n (each STA information field includes four octets and n is a natural number of no less than 1). In an embodiment, one or more of the fields of the HE NDPA frame illustrated in FIG. 5 is omitted or another field is added. In addition, a length of each field may differ from that illustrated in FIG. 5.

Each field of the HE NDPA frame will be described as follows. The Frame Control field includes information on a version of an MAC protocol and additional control information. The Duration field may include time information for setting a network allocation vector (NAV) or information on an identifier (for example, an AID) of a terminal. The RA field may include address information of the receiving device (for example, the STA or the HE Beamformee) of the corresponding HE NDPA frame. The TA field may include address information of the transmission device (for example, the AP or the HE Beamformer) of the corresponding HE NDPA frame. The Sounding Dialog Token field may be referred to as a Sounding Sequence field. A Sounding Dialog Token Number subfield in the Sounding Dialog Token field may include a value selected by the HE Beamformer in order to identify the HE NDPA frame.

The HE NDPA frame may include the STA information fields STA Info 1 to n corresponding to the number of receiving devices (for example, stations or HE Beamformees) receiving the HE NDPA frame. That is, the HE NDPA frame may include the STA information fields STA Info 1 to n including information on stations to be sounded.

In an embodiment, the STA information field (for example, STA Info 1) includes an 'AID11' subfield (or an AID subfield), a 'Partial BW Info' subfield (or a partial bandwidth information subfield), a 'Feedback Type and Ng' subfield, a 'Disambiguation' subfield, a 'Codebook Size' subfield, and an 'Nc' subfield. Each subfield may be defined by the 802.11ax standard. Each subfield of the STA information field may be partially omitted and another subfield may be added. In addition, a length of each subfield may differ from that illustrated in FIG. 5.

For example, the 'Partial BW Info' subfield may include information (that is, partial bandwidth information) on a channel of which a state is requested by the AP (or the HE Beamformer) to be measured by the station (or the HE Beamformee). Specifically, the 'Partial BW Info' subfield may include an 'RU Start Index' instructing first subcarrier index information of the channel to be measured and an 'RU End Index' instructing last subcarrier index information of the channel to be measured. In an embodiment, the first subcarrier index information indicates a first frequency, and the second subcarrier index indicates a second frequency larger than the first frequency. In an embodiment, each of the 'RU Start Index' and the 'RU End Index' include 7 bits. For example, the AID 11 may be 11 bits B0 to B10, the Partial BW info may be 14 bits B11 to B24, the Feedback Type and Ng may be 2 bits B25 to B26, the Disambiguation may be 1-bit B27, the Codebook Size may be 1 bit B28, and the Nc may be 3 bits B29 to B31.

Here, referring to FIG. 6, when an entire bandwidth is 20 MHz, an example of an RU index and subcarrier range in accordance with an RU type is illustrated.

Furthermore, referring to FIG. 7, an example of 'RU Start Index (' S')' and 'RU End Index ('E')' by bandwidth in accordance with the RU index when 'Ng=16' is illustrated.

That is, the stations (or the HE Beamformees) may measure channel state information corresponding to subcarriers in a subcarrier index range mapped to 'RU Start Index' and 'RU End Index' based on the tables of FIGS. 6 and 7 and may feedback the measured channel state information to the AP (or the HE Beamformer).

In an embodiment, the channel state information includes information on a phase and magnitude of an estimated channel frequency response and information on an average signal to noise ratio (SNR) of a corresponding channel frequency band.

Accordingly, the transmission device (for example, the AP or the HE Beamformer) may designate different indexes (that is, different 'RU Start Indexes' and/or 'RU End Indexes') of the 'Partial BW Info' subfield to the respective receiving devices (for example, the stations or the HE Beamformees). Therefore, the transmission device (for example, the AP or the HE Beamformer) may request channel state information on different partial bandwidths from the respective receiving devices (for example, the stations or the HE Beamformees). The transmission device (for example, the AP or the HE Beamformer) may allocate an RU, may select a modulation and coding scheme (MCS), and may determine the number of space-time stream allocations by using the channel state information received from the respective receiving devices (for example, the stations or the HE Beamformees).

The HE NDPA frame of the 802.11ax standard may be configured as described above. As illustrated in FIGS. 8A and 8B, in a state in which multiple RUs are designated as an RU (that is, an RU corresponding to a channel feedback section of a receiving device set by a transmission device) to be measured by the respective receiving devices (for example, the stations or the HE Beamformees), when the transmission device (for example, the AP or the HE Beamformer) sets the channel feedback section (that is, a channel state information feedback section) of the corresponding receiving device by using a partial bandwidth feedback method of the 802.11ax standard, overhead may increase in a process of feeding back channel state information. Here, the RU may mean downlink resources.

For example, in FIGS. 8A and 8B, it is illustrated that a 484+2×996 multiple RU is designated as an RU to be measured by a first receiving device STA #1 and a 484 single RU is designated as an RU to be measured by a second receiving device STA #2.

For example, when the transmission device sets channel feedback sections of the first and second receiving devices based on the partial bandwidth feedback method of the 802.11ax standard, 'RU Start Index and RU End Index' of the first receiving device STA #1 become '0 and 111' and 'RU Start Index and RU End Index' of the second receiving device STA #2 become '18 and 35'.

Therefore, the first receiving device STA #1 feeds back channel state information corresponding to second 484 RU to the transmission device even though the second 484 RU is designated as the channel feedback section of the second receiving device STA #2. That is, because the first receiving device STA #1 feeds back channel state information of a channel feedback section that is not designated as its channel feedback section to the transmission device, unnecessary overhead may increase in a process of feeding back the channel state information.

For example, the above-described increase in overhead may occur in both a case in which downlink channel RUs of the first and second receiving devices are previously allocated and a case in which downlink channel RUs of the first and second receiving devices are not previously allocated.

Specifically, when the downlink channel RUs of the first and second receiving devices are previously allocated, the transmission device may set the previously allocated downlink channel RUs for the first and second receiving devices as the channel feedback sections of the first and second receiving devices. On the other hand, when the downlink channel RUs of the first and second receiving devices are not previously allocated, the transmission device may arbitrarily set the channel feedback sections of the first and second receiving devices and may request the first and second receiving devices to feedback an entire bandwidth channel. For example, the process of feeding back the channel state information is performed in a state in which the downlink channel RUs of the first and second receiving devices have not previously been allocated in order to obtain channel state information for allocating an initial downlink channel RU.

Accordingly, unnecessary overhead may increase in the process of feeding back the channel state information in each of the above-described two states. Because the above-described two states may be applied to an embodiment of the inventive concept, hereinafter, description of an embodiment of the inventive concept will be made assuming such states.

On the other hand, because a bandwidth of 320 MHz and 16 space-time streams are supported in the 802.11be standard, a feedback target (that is, a bandwidth or the number of space-time streams) increases in comparison with the 802.11ax standard so that overhead may also increase in the process of feeding back the channel state information.

To reduce overhead, according to an embodiment of the inventive concept, an NDPA frame is applied to a next generation standard (for example, the EHT standard). The NDPA frame is capable of reducing overhead in the process of feeding back the channel state information.

For example, the conventional NDPA frame (that is, an EHT NDPA frame of the 802.11be standard) is modified according to an exemplary embodiment of the inventive concept.

The Sounding Dialog Token field of the EHT NDPA frame includes 1 byte (that is, 8 bits) and may indicate the standard of the corresponding NDPA frame by using 2 bits among the 8 bits. For example, 00' may indicate that the corresponding NDPA frame is a very high throughput (VHT) NDPA frame or the EHT NDPA frame, '01' may indicate that the corresponding NDPA frame is the HE NDPA frame or the EHT NDPA frame, and '11' may indicate that the corresponding NDPA frame is the EHT NDPA frame.

In an exemplary embodiment, each of the 'RU Start Index' and the 'RU End Index' in the 'Partial BW Info' subfield of the EHT NDPA frame may include, for example, 8 bits (in this case, the 'Partial BW Info' subfield may include 16 bits) in order to represent a bandwidth of up to 320 MHz. Therefore, the 'RU Start Index' and the 'RU End Index' may include, for example, one of indexes 0 to 255. Each of the 'RU Start Index' and the 'RU End Index' may include bits (for example, 4 bits, 6 bits, or 7 bits) less than 8 bits. In some embodiments, as described later with reference to FIG. 22, the 'Partial BW Info' subfield of the EHT NDPA frame may include 9 bits.

The 'Nc' subfield of the EHT NDPA frame may include 4 bits in order to support 16 space-time streams.

In addition, in order to prevent VHT stations from wrongly identifying an AID in the HE NDPA frame or the EHT NDPA frame, the 'Disambiguation' subfield of the EHT NDPA frame may be inserted into each specific position (that is, B(16*n+11) (n is a natural number of no less than 1; for example, B(27), B(43), or B(59)). At this time, the 'Disambiguation' subfield may include 1 bit and a value of the 'Disambiguation' subfield may be '1'.

As described above, because the above-described common improvements may be applied to the NDPA frame according to an embodiment of the inventive concept (that is, the EHT NDPA frame for the 802.11be standard), hereinafter, reference to FIGS. 9 to 17B, various examples of the user information field (that is, the STA information field ((the STA Info field)) in the NDPA frame according to an embodiment of the inventive concept will be described in detail.

Figure 9:
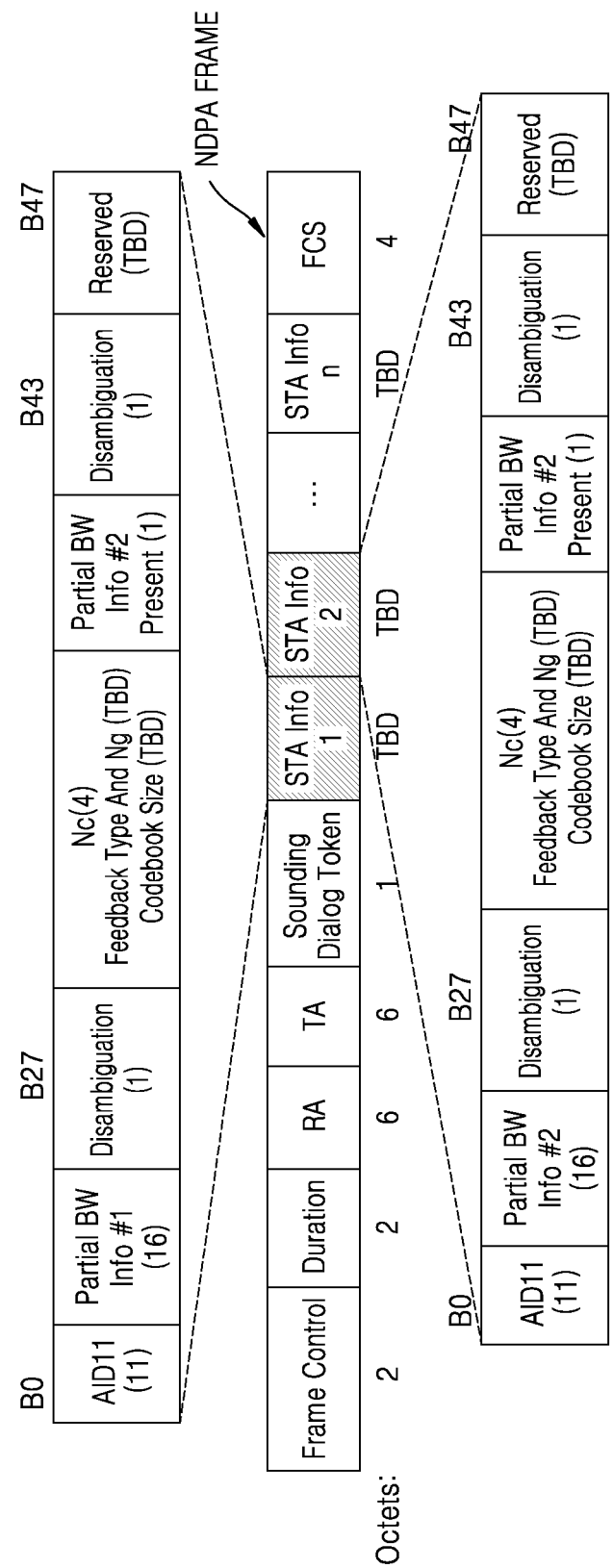
FIG. 9 is a view illustrating an example of a user information field in an NDPA frame according to an embodiment of the inventive concept.
Figure 10:
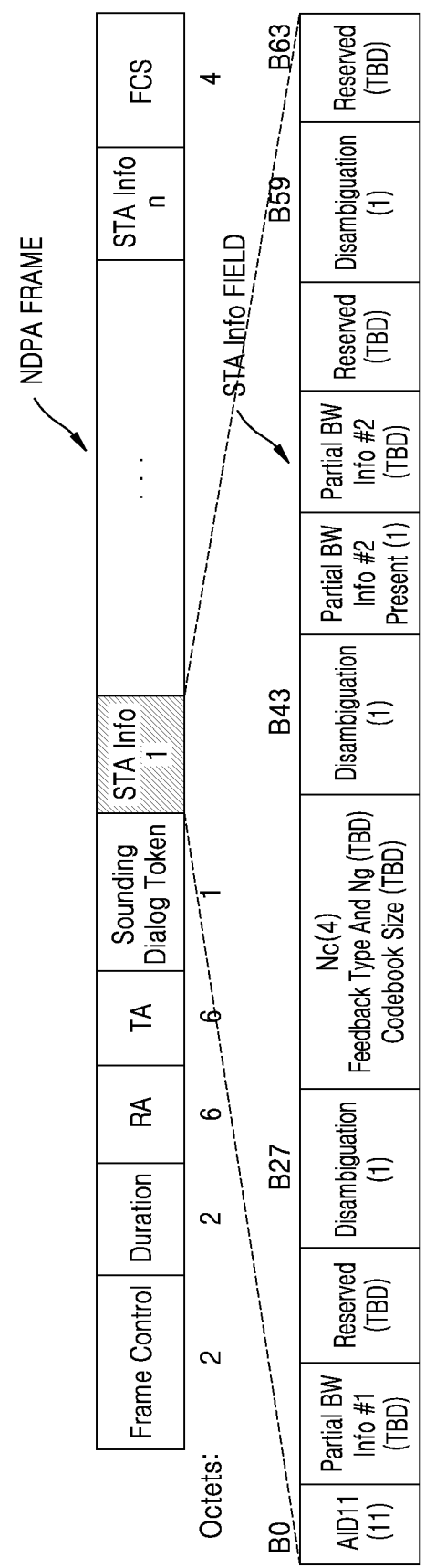
FIG. 10 is a view illustrating another example of a user information field in an NDPA frame according to an embodiment of the inventive concept.
Figure 11A:
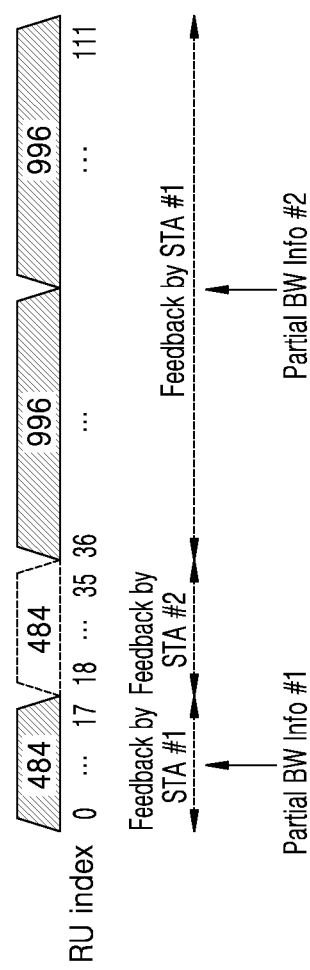
Figure 12:
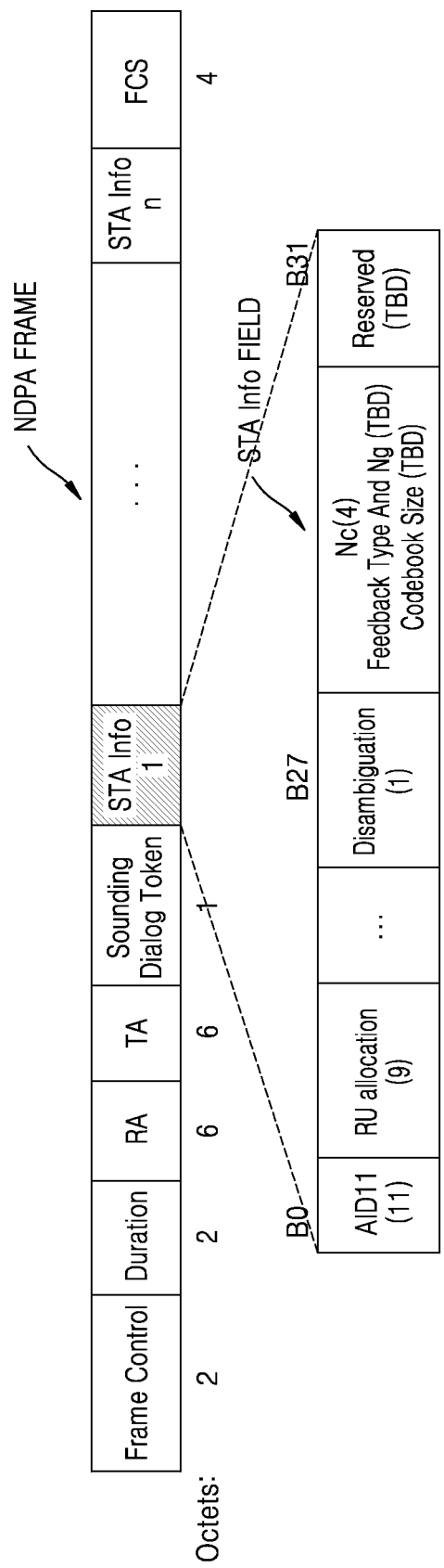
FIG. 12 is a view illustrating another example of a user information field in an NDPA frame according to an embodiment of the inventive concept.
Figure 17A:
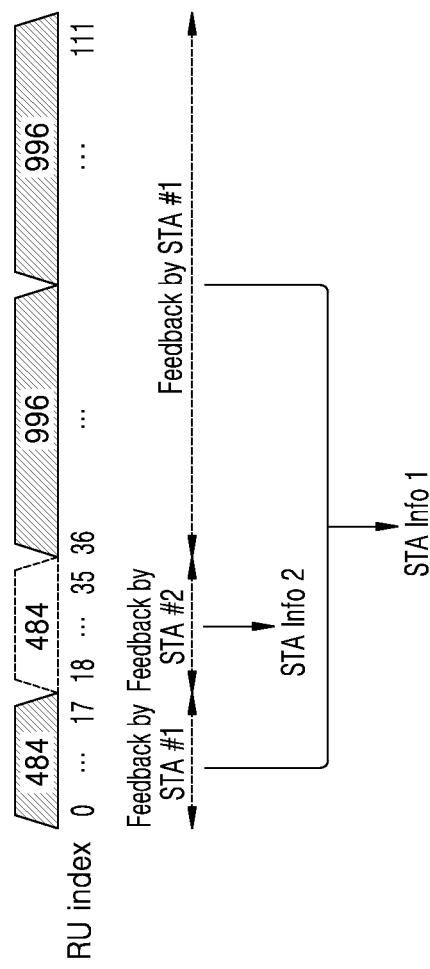

FIG. 9 is a view illustrating an example of a user information field in an NDPA frame according to an exemplary embodiment of the inventive concept. FIG. 10 is a view illustrating another example of a user information field in an NDPA frame according to an embodiment of the inventive concept. FIGS. 11A and 11B are views illustrating a feedback section setting example when the partial bandwidth feedback method illustrated in FIGS. 9 and 10 is applied in a multiple RU allocation environment. FIG. 12 is a view illustrating another example of a user information field in an NDPA frame according to an embodiment of the inventive concept. FIG. 13 is a view illustrating an example of an RU position in accordance with a value of an RU Allocation subfield. FIG. 14 is a table illustrating an example of a subcarrier index in accordance with a value of an RU Allocation subfield in a bandwidth of 20 MHz. FIG. 15 is a table illustrating an example of a subcarrier index in accordance with a value of an RU Allocation subfield in a bandwidth of 40 MHz. FIGS. 16A and 16B are tables illustrating an example of a subcarrier index in accordance with a value of an RU Allocation subfield in a bandwidth of 80 MHz. FIGS. 17A and 17B are views illustrating a feedback section setting example when the partial bandwidth feedback method illustrated in FIG. 12 is applied in a multiple RU allocation environment.

For example, the NDPA frame described in FIGS. 9 to 17B may be generated by the wireless communication device 200 illustrated in FIGS. 2 and 3 when the wireless communication device 200 is the AP or may be decoded by the wireless communication device 200 illustrated in FIGS. 2 and 3 when the wireless communication device 200 is the station.

First, referring to FIG. 9, an example of the user information field (that is, the STA Info field) in the NDPA frame according to an embodiment of the inventive concept is illustrated.

FIG. 9 illustrates the NDPA frame capable of setting two or more STA Info fields for one receiving device (for example, a station or an HE Beamformee) in which multiple RUs are designated as a channel feedback section. That is, when a plurality of partial bandwidths (two or more partial bandwidths each of which may include one RU or a set of a plurality of adjacent RUs; for example, the two 996 RUs of FIG. 8A configure one partial bandwidth) are designated as the channel feedback section of one receiving device, the NDPA frame of FIG. 9 may include a plurality of STA Info fields (for example, two or more STA Info fields) respectively indicating subcarrier indexes respectively corresponding to the partial bandwidths. For convenience of discussion, according to an embodiment of the inventive concept, the NDPA frame setting 'two STA Info fields' for one receiving device (for example, the station or the HE Beamformee) in which the multiple RUs are designated as the channel feedback section is taken as an example.

For example, although the plurality of STA Info fields include different 'Partial BW Info' subfields, each identifier subfield (the 'AID11' subfield) may have the same index. In addition, each of the 'Partial BW Info' subfields of the STA Info fields indicates 'first subcarrier index information' and 'last subcarrier index information' corresponding to each of the partial bandwidths (for reference, the partial bandwidths are not adjacent to one another), which will be described in detail hereinafter.

Specifically, the NDPA frame of FIG. 9 may be included in a payload (more specifically, a data field of payload) of a PPDU. The NDPA frame may include an MAC header, a frame body, and an FCS field.

In particular, the frame body may include a Sounding Dialog Token field and one or more STA information fields STA Info 1 to n (n is a natural number of no less than 1 and the STA information field may be referred to as the user information field).

For example, the first STA information field STA Info 1 of the one or more STA information fields STA Info 1 to n may be applied to the receiving device (for example, the station or the HE Beamformee) expected to receive the PPDU including the NDPA frame from the transmission device (for example, the AP or the HE Beamformer). Therefore, the first STA information field STA Info 1 may include STA specific control information applied to the corresponding receiving device.

Here, the first STA information field STA Info 1 may further include a 'Partial BW Info #1' subfield, a 'Partial BW Info #2 Present' subfield, and a 'Reserved' subfield other than an 'AID11' subfield, a 'Feedback Type and Ng' subfield, a 'Disambiguation' subfield, a 'Codebook Size' subfield, and an 'Nc' subfield.

Some of the 'AID11' subfield, the 'Feedback Type and Ng' subfield, the 'Disambiguation' subfield, the 'Codebook Size' subfield, the 'Nc' subfield, and the 'Reserved' subfield may be configured in accordance with the characteristics of the EHT NDPA frame and the others may be configured in accordance with the characteristics of the HE NDPA frame. For reference, according to an embodiment of the inventive concept, the number of bits of a subfield (for example, the 'Feedback Type and Ng' subfield) in which not the number of bits but 'TBD' is written may change. That is, in subfields in each of which 'TBD' is written, the number of bits is not determined and may change. In subfields in each of which 'the number of bits' is written, the number of bits may also change. For convenience of discussion, according to an embodiment of the inventive concept, it is described that, in the subfields in each of which 'TBD' is written, the number of bits may change and, in the subfields in each of which 'the number of bits' is written, the subfields include the corresponding bits.

The 'Partial BW Info #1' subfield may include, for example, 16 bits (or bits less than 16 bits) and may be a partial bandwidth information subfield including subcarrier index information corresponding to a partial bandwidth designated as the channel feedback section of the corresponding receiving device. In addition, the 'Partial BW Info #2 Present' subfield may include 1 bit and may indicate whether an additional partial bandwidth designated as the channel feedback section of the corresponding receiving device is provided except the partial bandwidth.

That is, in the NDPA frame of FIG. 9, unlike in the HE NDPA frame of FIG. 5, the 'Partial BW Info #2 Present' subfield is newly added. The transmission device may determine whether the additional partial bandwidth designated as the channel feedback section of the corresponding receiving device is provided through the 'Partial BW Info #2 Present' subfield.

Specifically, when the additional partial bandwidth designated as the channel feedback section of the corresponding receiving device is provided, a value of the 'Partial BW Info #2 Present' subfield may be '1' and, when the additional partial bandwidth designated as the channel feedback section of the corresponding receiving device is not provided, the value of the 'Partial BW Info #2 Present' subfield may be '0'.

Furthermore, when the additional partial bandwidth designated as the channel feedback section of the corresponding receiving device is provided, (that is, when the value of the 'Partial BW Info #2 Present' subfield is '1'), the frame body may further include the second STA information field STA Info 2 as the STA information field applied to the corresponding receiving device.

Here, the second STA information field STA Info 2 may include a partial bandwidth information subfield (a 'Partial BW Info #2' subfield) including subcarrier index information corresponding to the additional partial bandwidth and the subfield (the 'Partial BW Info #2 Present' subfield) indicating that the additional partial bandwidth is designated as the channel feedback section of the corresponding receiving device. Furthermore, the identifier subfield (the 'AID11' subfield) of the second STA information field STA Info 2 may have the same index as that of the identifier subfield (the 'AID11' subfield) of the first STA information field STA Info 1.

For reference, as illustrated in FIG. 9, when the number of partial bandwidths of the receiving device in which the multiple RUs are designated as the channel feedback section is 2 (that is, when the number of STA Info fields is 2), the additional partial bandwidth presence subfield (the 'Partial BW Info #2 Present' subfield) need not be included in the second STA information field STA Info 2. In this case, in the second STA information field STA Info 2, instead of the additional partial bandwidth presence subfield (the 'Partial BW Info #2 Present' subfield), the 'Reserved' subfield may be included.

Furthermore, unlike in FIG. 9, when the number of partial bandwidths of the receiving device in which the multiple RUs are designated as the channel feedback section is 3 (that is, when the number of STA Info fields is 3), in the second STA information field STA Info 2, except the 'Partial BW Info #2 Present' subfield, a subfield (a 'Partial BW Info #3 Present' subfield) indicating whether an additional partial bandwidth (Partial BW #3) is provided may be included.

According to an embodiment of the inventive concept, for convenience of discussion, it is described that the second STA information field STA Info 2 has the structure illustrated in FIG. 9.

The second STA information field STA Info 2 may be included in the NDPA frame immediately behind the first STA information field STA Info 1. For example, the second STA information field STA Info 2 may appear after the first STA information field STA Info 1.

In the 'Partial BW Info #1' subfield of the first STA information field STA Info 1, the first and last subcarrier index information items corresponding to the partial bandwidth may be included and, in the 'Partial BW Info #2' subfield of the second STA information field STA Info 2, the first and last subcarrier index information items corresponding to the additional partial bandwidth may be included.

In addition, each of the partial bandwidth information subfields (the 'Partial BW Info #1' subfield and the 'Partial BW Info #2' subfield) of the first and second STA information fields STA Info 1 and 2 may include, for example, 16 bits (or less or greater than 16 bits). Each of the additional partial bandwidth presence subfields (the 'Partial BW Info #1 Present' subfield and the 'Partial BW Info #2 Present' subfield) of the first and second STA information fields STA Info 1 and 2 may include, for example, 1 bit.

However, when the additional partial bandwidth designated as the channel feedback section of the corresponding receiving device is not provided, in the frame body, only the first STA information field STA Info 1 is included as the STA information field applied to the corresponding receiving device. In this case, the second STA information field STA Info 2 illustrated in FIG. 9 may be applied to another receiving device.

For reference, in the NDPA frame of FIG. 9, each of the STA Info fields may include, for example, 48 bits (e.g., B0 to B47). In this case, the 'Disambiguation' subfield may be inserted into each of $27^{th}$ and $43^{rd}$ bits by the above-described 'Disambiguation' subfield inserting method. In addition, in order to indicate that the corresponding NDPA frame is the EHT NDPA frame, 2 bits of the Sounding Dialog Token field may be allocated as '00, 01, or 11'. Each of the STA Info fields of FIG. 9 may include bits other than 48 bits. However, according to an embodiment of the inventive concept, for convenience of discussion, it is illustrated that each of the STA Info fields of FIG. 9 includes 48 bits.

Because the user information field in the NDPA frame according to an embodiment of the inventive concept is configured as described above, when the transmission device transmits the NDPA frame illustrated in FIG. 9 to the receiving device in which the multiple RUs including the plurality of partial bandwidths are designated as the channel feedback section, the corresponding receiving device may feedback only state information of a channel designated thereto to the transmission device based on the received NDPA frame. Therefore, it is possible to prevent unnecessary overhead from increasing in a process of feeding back the channel state information.

FIG. 10 illustrates another example of the user information field (that is, the STA Info field) in the NDPA frame according to an embodiment of the inventive concept.

FIG. 10 illustrates the NDPA frame capable of setting two or more partial bandwidth information subfields in one STA Info field for one receiving device (for example, a station or an HE Beamformee) in which multiple RUs are designated as a channel feedback section. That is, when a plurality of partial bandwidths (two or more partial bandwidths each of which may include one RU or a set of a plurality of adjacent RUs; for example, the two 996 RUs of FIG. 8A configure one partial bandwidth) are designated as the channel feedback section of one receiving device, the NDPA frame of FIG. 10 may include a plurality of partial bandwidth information subfields respectively indicating subcarrier indexes respectively corresponding to the partial bandwidths (for reference, the partial bandwidths are not adjacent to one another) in one STA Info field. Therefore, the NDPA frame of FIG. 10 further includes one or more additional Partial BW Info' subfields for one or more additional partial bandwidths that are not adjacent to the one partial bandwidth except a 'Partial BW Info' subfield for one partial bandwidth, which will be described in detail hereinafter. For convenience of discussion, according to an embodiment of the inventive concept, the NDPA frame setting 'two partial bandwidth information subfields' in one STA Info field for one receiving device (for example, the station or the HE Beamformee) in which the multiple RUs are designated as the channel feedback section is taken as an example.

In an embodiment, the NDPA frame of FIG. 10 is included in a payload (more specifically, a data field of payload) of a PPDU. The NDPA frame may include an MAC header, a frame body, and an FCS field.

In an embodiment, the frame body includes a Sounding Dialog Token field and one or more STA information fields STA Info 1 to n (n is a natural number of no less than 1).

For example, the first STA information field STA Info 1 of the one or more STA information fields STA Info 1 to n may be applied to the receiving device (for example, the station or the HE Beamformee) expected to receive the PPDU including the NDPA frame from the transmission device (for example, the AP or the HE Beamformer). Therefore, the first STA information field STA Info 1 may include STA specific control information applied to the corresponding receiving device.

In an embodiment, the first STA information field STA Info 1 further includes a 'Partial BW Info #1' subfield, a 'Partial BW Info #2 Present' subfield, and a 'Reserved' subfield other than an 'AID11' subfield, a 'Feedback Type and Ng' subfield, a 'Disambiguation' subfield, a 'Codebook Size' subfield, and an 'Nc' subfield. The first STA information field STA Info 1 may further include a 'Partial BW Info #2' subfield depending on a situation, which will be described in detail later.

Some of the 'AID11' subfield, the 'Feedback Type and Ng' subfield, the 'Disambiguation' subfield, the 'Codebook Size' subfield, the 'Nc' subfield, and the 'Reserved' subfield may be configured in accordance with the characteristics of the EHT NDPA frame and the others may be configured in accordance with the characteristics of the HE NDPA frame. While three 'Reserved' subfields are illustrated in FIG. 10, the inventive concept is not limited thereto. For example, the number of 'Reserved' subfields may be changed from that illustrated in FIG. 10 (for example, the 'Reserved' subfield may be arranged only in B63). For reference, according to an embodiment of the inventive concept, the number of bits of a subfield (for example, the 'Feedback Type and Ng' subfield) in which not the number of bits but 'TBD' is written may change. That is, in subfields in each of which 'TBD' is written, the number of bits is not determined and may change.

The 'Partial BW Info #1' subfield may be a partial bandwidth information subfield including subcarrier index information corresponding to a partial bandwidth designated as the channel feedback section of the corresponding receiving device. The number of bits of the 'Partial BW Info #1' subfield may be 'TBD'. For example, the number of bits of the 'Partial BW Info #1' subfield may range between 1 bit to 16 bits. For example, the number of bits of the corresponding subfield may be 14 bits. In another example, the corresponding subfield may be greater than 16 bits.

For reference, the number of bits of the 'Partial BW Info #1' subfield may change in accordance with which subcarrier units 'RU Start Index' and 'RU End Index' of the 'Partial BW Info #1' subfield are set. For example, the number of bits of the 'Partial BW Info #1' subfield may be less when the 'RU Start Index' and 'RU End Index' of the 'Partial BW Info #1' subfield are set in units of 52-tone RU, 106-tone RU, or 242-tone RU than when the 'RU Start Index' and 'RU End Index' of the 'Partial BW Info #1' subfield are set in units of 26-tone RU (that is, 26-subcarrier RU) Therefore, in order to reduce the number of bits of the 'Partial BW Info #1' subfield to no more than 16 bits, the 'RU Start Index' and 'RU End Index' of the 'Partial BW Info #1' subfield may be set in units of 52-tone RU, 106-tone RU, or 242-tone RU.

In addition, the 'Partial BW Info #2 Present' subfield includes 1 bit and indicates whether an additional partial bandwidth designated as the channel feedback section of the corresponding receiving device is provided except the partial bandwidth.

That is, in the NDPA frame of FIG. 9, unlike in the HE NDPA frame, the 'Partial BW Info #2 Present' subfield is newly added and the transmission device determines whether the additional partial bandwidth designated as the channel feedback section of the corresponding receiving device is provided using the 'Partial BW Info #2 Present' subfield.

In an embodiment, when the additional partial bandwidth designated as the channel feedback section of the corresponding receiving device is provided, a value of the 'Partial BW Info #2 Present' subfield is '1' and, when the additional partial bandwidth designated as the channel feedback section of the corresponding receiving device is not provided, the value of the 'Partial BW Info #2 Present' subfield is '0'.

Furthermore, when the additional partial bandwidth designated as the channel feedback section of the corresponding receiving device is provided, (that is, when the value of the 'Partial BW Info #2 Present' subfield is '1'), the first STA information field STA Info 1 further includes a 'Partial BW Info #2' subfield. On the other hand, when the additional partial bandwidth designated as the channel feedback section of the corresponding receiving device is not provided, only the 'Partial BW Info #1' subfield is included as the partial bandwidth information subfield in the first STA information field STA Info 1.

Here, the 'Partial BW Info #2' subfield may be an additional partial bandwidth information subfield including subcarrier index information corresponding to an additional partial bandwidth designated as the channel feedback section of the corresponding receiving device. That is, the number of bits of the 'Partial BW Info #2' subfield is 'TBD' and may change to range between 1 bit to 16 bits. For example, the number of bits of the corresponding subfield may be 14 bits in the same principle as the above-described method of setting the number of bits of 'Partial BW Info #1' subfield. In another example, the subfield may be greater than 16 bits.

For example, the 'Partial BW Info #2' subfield may be arranged in the first STA information field STA Info 1 immediately behind the 'Partial BW Info #2 Present' subfield. The first and last subcarrier index information items corresponding to the partial bandwidth may be included in the 'Partial BW Info #1' subfield and the first and last subcarrier index information items corresponding to the additional partial bandwidth may be included in the 'Partial BW Info #2' subfield.

In an embodiment, in the NDPA frame of FIG. 10, each of the STA Info fields include, for example, 64 bits. In this case, the 'Disambiguation' subfield may be inserted into each of $27^{th}$, $43^{rd}$, and $59^{th}$ bits by the above-described 'Disambiguation' subfield inserting method. In addition, in order to indicate that the corresponding NDPA frame is the EHT NDPA frame, 2 bits of the Sounding Dialog Token field may be allocated as '00, 01, or 11'. Each of the STA Info fields of FIG. 10 may include bits other than 64 bits. However, according to an embodiment of the inventive concept, for convenience sake, it is illustrated that each of the STA Info fields of FIG. 10 includes 64 bits.

Because another example of the user information field in the NDPA frame according to an embodiment of the inventive concept is configured as described above, when the transmission device transmits the NDPA frame illustrated in FIG. 10 to the receiving device in which the multiple RUs including the plurality of partial bandwidths are designated as the channel feedback section, the corresponding receiving device may feedback only state information of a channel designated thereto to the transmission device based on the received NDPA frame. Therefore, it is possible to prevent unnecessary overhead from increasing in a process of feeding back the channel state information.

As described above, examples of the user information field in the NDPA frame according to an embodiment of the inventive concept may be configured to support a multiple RU designation situation and the 802.11be standard (or a standard derived from the 802.11be standard).

Therefore, as illustrated in FIGS. 11A and 11B, although the multiple RUs are designated as an RU to be measured by the receiving device (for example, the station or the HE Beamformee), when the transmission device (for example, the AP or the HE Beamformer) sets the channel feedback section of the corresponding receiving device based on the partial bandwidth feedback method according to an embodiment of the inventive concept, which is described above with reference to FIGS. 9 and 10, it is possible to prevent overhead from increasing in a process of feeding back the channel state information.

For reference, in FIGS. 11A and 11B, it is illustrated that a 484+2×996 multiple RU is designated as an RU to be measured by a first receiving device STA #1 and a 484 single RU is designated as an RU to be measured by a second receiving device STA #2.

For example, when the transmission device sets channel feedback sections of the first and second receiving devices based on the partial bandwidth feedback method described above with reference to FIGS. 9 and 10, 'RU Start Index and RU End Index' of the second receiving device STA #2 may become '18 and 35' and partial bandwidth information of the first receiving device STA #1 may be divided into two (Partial BW Info #1 and Partial BW Info #2). That is, 'RU Start Index and RU End Index' of the first partial bandwidth of the first receiving device STA #1 may become '0 and 17' and 'RU Start Index and RU End Index' of the second partial bandwidth of the first receiving device STA #1 may become '36 and 111'.

Therefore, the first receiving device STA #1 may feedback only channel state information of a channel feedback section designated as its channel feedback section to the transmission device without repeatedly feeding back channel state information of a second 484 RU (that is, RU indexes 18 to 35) designated as the channel feedback section of the second receiving device STA #2 to the transmission device. That is, because the first receiving device STA #1 does not feedback channel state information of a channel feedback section that is not designated as its channel feedback section to the transmission device, it is possible to prevent unnecessary overhead from increasing in a process of feeding back the channel state information.

FIG. 12 illustrates another example of the user information field (that is, the STA Info field) in the NDPA frame according to an embodiment of the inventive concept is illustrated.

Unlike FIGS. 9 and 10, FIG. 12 illustrates the NDPA frame in which, instead of a partial bandwidth information subfield, an RU allocation subfield is added to an STA Info field for one receiving device (for example, a station or an HE Beamformee) in which multiple RUs are designated as a channel feedback section. That is, when a plurality of partial bandwidths (two or more partial bandwidths each of which may include one RU or a set of a plurality of adjacent RUs; for example, the two 996 RUs of FIG. 8A configure one partial bandwidth) are designated as the channel feedback section of one receiving device, the NDPA frame of FIG. 12 may include the RU allocation subfield indicating the channel feedback section of the corresponding receiving device in the STA Info field. For example, a size and position of an RU requested by the transmission device (for example, the Beamformer) to be fed back may be identified by an RU Allocation subfield along with bandwidth information, which will be described in detail.

For example, the NDPA frame of FIG. 12 may be included in payload (more specifically, a data field of payload) of a PPDU. The NDPA frame may include an MAC header, a frame body, and an FCS field.

In particular, the frame body may include a Sounding Dialog Token field and one or more STA information fields STA Info 1 to n, where n is a natural number of no less than 1.

For example, the first STA information field STA Info 1 of the one or more STA information fields STA Info 1 to n may be applied to the receiving device (for example, the station or the HE Beamformee) expected to receive the PPDU including the NDPA frame from the transmission device (for example, the AP or the HE Beamformer). Therefore, the first STA information field STA Info 1 may include STA specific control information applied to the corresponding receiving device.

Here, the first STA information field STA Info 1 may further include an 'RU Allocation' subfield and a 'Reserved' subfield other than an 'AID11' subfield, a 'Feedback Type and Ng' subfield, a 'Disambiguation' subfield, a 'Codebook Size' subfield, and an 'Nc' subfield.

Some of the 'AID11' subfield, the 'Feedback Type and Ng' subfield, the 'Disambiguation' subfield, the 'Codebook Size' subfield, the 'Nc' subfield, and the 'Reserved' subfield may be configured in accordance with the characteristics of the EHT NDPA frame and the others may be configured in accordance with the characteristics of the HE NDPA frame. For reference, according to an embodiment of the inventive concept, the number of bits of a subfield (for example, the 'Feedback Type and Ng' subfield) in which not the number of bits but 'TBD' is written may change. That is, in subfields in each of which 'TBD' is written, the number of bits is not determined and may change.

The 'RU Allocation' subfield may include, for example, specific bits (for example, 9 bits. For example, 2 bits are used for indicating to which band the channel feedback section of the station belongs to and the remaining 7 bits are used for indicating a single RU or multiple RUs designated as the channel feedback section of the station) in order to represent a bandwidth of up to 320 MHz in accordance with the 802.11be standard and may include index information of an RU designated as the channel feedback section of the corresponding receiving device. The index information of the RU may indicate a size and position of the corresponding RU.

For reference, among '9 bits (for example, B8 (least significant bit (LSB)), B7, B6, B5, B4, B3, B2, B1, and B0 (most significant bit (MSB))' of the 'RU Allocation' subfield, '7 bits' used for indicating information on the RU designated as the channel feedback section of the receiving device may be 'B7 to B 1' and the remaining '2 bits' used for indicating to which band the channel feedback section of the receiving device belongs may be 'B8 and B0'. In this case, for example, values (8 bits; values of 'B7 to B0') of the 'RU Allocation' subfield of a trigger frame defined in the 802.11ax(HE) standard may be used as the values of 'B7 to B0' of the 'RU Allocation' subfield.

In addition, among '9 bits' of the 'RU Allocation' subfield, '7 bits' used for indicating information on the RU designated as the channel feedback section of the receiving device may be 'B8 to B2' and the remaining '2 bits' used for indicating to which band the channel feedback section of the receiving device belongs may be 'B 1 and B0'. In this case, for example, the values (8 bits; the values of 'B7 to B0') of the 'RU Allocation' subfield of the trigger frame defined in the 802.11ax(HE) standard may be used as values of 'B8 to B2 and B0' or 'B8 to B1' of the 'RU Allocation' subfield.

If the bandwidth of 320 MHz is represented, the 'RU Allocation' subfield may include other bits (for example, bits no less than 10 bits or no more than 8 bits) than 9 bits. For example, when the minimum size of the RU is set not as the 26-tone RU but as the 242-tone RU, the 'RU Allocation' subfield may represent the bandwidth of 320 MHz only by 7 bits. According to an embodiment of the inventive concept, for convenience of discussion, it is illustrated that the 'RU Allocation' subfield includes 9 bits.

For example, the receiving device may determine subcarrier index information corresponding to corresponding index information based on the index information of the 'RU Allocation' subfield by using a mapping table stored therein. Here, the mapping table may include, for example, the tables described later with reference to FIGS. 14 to 16. However, the inventive concept is not limited thereto. In addition, the subcarrier index information (that is, the 'RU Start Index' and 'RU End Index' corresponding to the RU designated as the channel feedback section of the receiving device, for example, indexes in columns of 'RU Index', 'S', and 'E' of FIG. 14) corresponding to the index information (for example, indexes of a column of 'B7 to B1 of the RU Allocation subfield' of FIG. 14) of the 'RU Allocation' subfield may commonly indicate subcarrier indexes in a designated RU range or may situationally indicate subcarrier indexes out of the designated RU range in order to avoid extra-interpolation.

As described above, in the NDPA frame of FIG. 12, unlike in the HE NDPA frame, the 'RU Allocation' subfield is included instead of the 'Partial BW Info' subfield and the transmission device may set a section to be fed back by the corresponding device through the 'RU Allocation' subfield.

Here, referring to FIG. 13, an example of an RU size in accordance with a value of the 'RU Allocation' subfield is illustrated. Specifically, an example of a value of the 'RU Allocation' subfield, an RU size, and an RU position in accordance with an RU index is illustrated.

Furthermore, referring to FIGS. 13 to 16B, an example of subcarrier indexes in accordance with the value of the 'RU Allocation' subfield in bandwidths of 20 MHz, 40 MHz, and 80 MHz is illustrated. Specifically, an example of 'RU Start Index (' S')' and 'RU End Index ('E')' in accordance with the value of the 'RU Allocation' subfield, the RU size, and the RU index in each bandwidth is illustrated. FIG. 14 illustrates 20 MHz examples, FIG. 15 illustrates 40 MHz examples, and FIGS. 16A and 16B illustrate 80 MHz examples.

For reference, in the tables illustrated in FIGS. 14 to 16B, among '9 bits' of the 'RU Allocation' subfield, only '7 bits (that is, B7 to B1)' used for indicating information on the RU designated as the channel feedback section of the receiving device are illustrated and the remaining '2 bits (B8 (the LSB)) and B0 (the MSB)' used for indicating to which band the channel feedback section of the receiving device belongs are not illustrated.

Although not shown in the drawing, the '2 bits (B8 and B0)' used for indicating to which band the channel feedback section of the receiving device belongs may be set, for example, as follows.

when DL BW=320 MHz and the channel feedback section of the corresponding receiving device belongs to primary 160 MHz=>[B8 B0]=[0 0]

when DL BW=320 MHz and the channel feedback section of the corresponding receiving device belongs to higher 80 MHz of secondary 160 MHz=>[B8 B0]=[1 1]

when DL BW=240 MHz and the channel feedback section of the corresponding receiving device belongs to primary 80 MHz=>[B8 B0]=[x 0] (x may be 0 or 1)

when DL BW=240 MHz and the channel feedback section of the corresponding receiving device belongs not to primary 80 MHz but to 160 MHz=>[B8 B0]=[0 1]

when DL BW=160+80 MHz and the channel feedback section of the corresponding receiving device belongs to higher 80 MHz in 160 MHz=>[B8 B0]=[1 1]

when DL BW=160 MHz and the channel feedback section of the corresponding receiving device belongs to primary 80 MHz=>[B8 B0]=[x 0] (x is 0 or 1)

Because description of the '7 bits (B7 to B1)' and the '2 bits (B8 and B0)' of the 'RU Allocation' subfield illustrated in FIGS. 14 and 16B is only an example, the 'RU Allocation' subfield of FIG. 12 is not limited to the tables illustrated in FIGS. 14 and 16B and the above description.

As described above, the receiving device (for example, the station or the HE Beamformee) may determine the channel feedback section designated thereto based on the 'RU Allocation' subfield in the NDPA frame received from the transmission device (for example, the AP or the HE Beamformer). That is, the receiving device may determine the information represented in the tables of FIGS. 13 to 16B through the 'RU Allocation' subfield. In addition, the receiving device may measure the channel state information corresponding to subcarriers in a subcarrier index range mapped to 'RU Start Index' and 'RU End Index' based on the determined channel feedback section and may feedback the measured channel state information to the AP (or the HE Beamformer).

On the other hand, in the NDPA frame of FIG. 12, each of the STA Info fields may include, for example, 32 bits. In this case, the 'Disambiguation' subfield may be inserted into a $27^{th}$ bit by the above-described 'Disambiguation' subfield inserting method. In addition, in order to indicate that the corresponding NDPA frame is the EHT NDPA frame, 2 bits of the Sounding Dialog Token field may be allocated as '00, 01, or 11'. Each of the STA Info fields of FIG. 12 may include bits other than 32 bits. However, according to an embodiment of the inventive concept, for convenience of discussion, it is illustrated that each of the STA Info fields of FIG. 12 includes 32 bits.

When the user information field in the NDPA frame according to an embodiment of the inventive concept is configured as described above, when the transmission device transmits the NDPA frame illustrated in FIG. 12 to the receiving device in which the multiple RUs including the plurality of partial bandwidths are designated as the channel feedback section, the corresponding receiving device feeds back only state information of a channel designated thereto to the transmission device based on the received NDPA frame. Therefore, it is possible to prevent unnecessary overhead from increasing in a process of feeding back the channel state information.

As described above, examples of the user information field in the NDPA frame according to an embodiment of the inventive concept may be configured to support a multiple RU designation situation and the 802.11be standard (or a standard derived from the 802.11be standard).

Therefore, as illustrated in FIGS. 17A and 17B, although the multiple RUs are designated as an RU to be measured by the receiving device (for example, the station or the HE Beamformee), when the transmission device (for example, the AP or the HE Beamformer) sets the channel feedback section of the corresponding receiving device based on the partial bandwidth feedback method according to an embodiment of the inventive concept, which is described above with reference to FIG. 12, it is possible to prevent overhead from increasing in a process of feeding back the channel state information.

For reference, in FIGS. 17A and 17B, it is illustrated that a 484+2×996 multiple RU is designated as an RU to be measured by a first receiving device STA #1 and a 484 single RU is designated as an RU to be measured by a second receiving device STA #2.

For example, when the transmission device sets channel feedback sections of the first and second receiving devices based on the partial bandwidth feedback method described above with reference to FIG. 12, a value (that is, 9 bits) of the 'RU Allocation' subfield in the STA Info field (that is, STA Info 2) of the second receiving device STA #2 may become '001000001' and 'RU Start Index and RU End Index' corresponding to '001000001' may become '18 and 35'. In addition, in this case, a value (that is, 9 bits) of the 'RU Allocation' subfield in the STA Info field (that is, STA Info 1) of the first receiving device STA #1 may become '001010111' and 'RU Start Index and RU End Index' corresponding to '001010111' may become '0, 17' or '36, 111'.

Therefore, the first receiving device STA #1 may feedback only channel state information of a channel feedback section designated as its channel feedback section to the transmission device without repeatedly feeding back channel state information of a second 484 RU (that is, RU indexes 18 to 35) designated as the channel feedback section of the second receiving device STA #2 to the transmission device. That is, because the first receiving device STA #1 does not feedback channel state information of a channel feedback section that is not designated as its channel feedback section to the transmission device, it is possible to prevent unnecessary overhead from increasing in a process of feeding back the channel state information.

Because various examples of the user information field (that is, the STA information field STA Info field) in the NDPA frame according to an embodiment of the inventive concept are implemented as described above, hereinafter, referring to FIGS. 18 and 19, various examples of the MIMO control field (that is, a MIMO Control field) in the compressed beamforming frame Compressed Beamforming/CQI according to an embodiment of the inventive concept will be described in detail.

FIG. 18 is a view illustrating an example of an MIMO control field in a compressed beamforming frame according to an embodiment of the inventive concept. FIG. 19 is a view illustrating another example of an MIMO control field in a compressed beamforming frame according to an embodiment of the inventive concept.

For reference, the compressed beamforming frame described in FIGS. 18 and 19 may be generated by the wireless communication device 200 illustrated in FIGS. 2 and 3 when the wireless communication device 200 is the station or may be decoded by the wireless communication device 200 illustrated in FIGS. 2 and 3 when the wireless communication device 200 is the AP. The compressed beamforming frame may be transmitted by the receiving device (for example, the station or the HE Beamformee) to the transmission device (for example, the AP or the HE Beamformer).

Referring to FIG. 18, an example of an MIMO control field in a compressed beamforming frame according to an embodiment of the inventive concept is illustrated.

FIG. 18 illustrates the compressed beamforming frame including subcarrier index information items respectively corresponding to a plurality of partial bandwidths (two or more partial bandwidths each of which may include one RU or a set of a plurality of adjacent RUs; for example, the two 996 RUs of FIG. 8A configure one partial bandwidth) in one MIMO control field. That is, when the receiving device (for example, the station or the HE Beamformee) is requested by the transmission device (for example, the AP or the HE Beamformer) to transmit channel state information on multiple RUs through the NDPA frame, the compressed beamforming frame of FIG. 18 may include a plurality of partial bandwidth information subfields respectively indicating subcarrier indexes respectively corresponding to the partial bandwidths (for reference, the partial bandwidths are not adjacent to one another) in one MIMO control field. That is, the receiving device may use the same indexing (for example, a value of [S, E] matched to RU Index) as that of the transmission device in order to represent 'first subcarrier index information' and 'last subcarrier index information' corresponding to each of the RUs in the MIMO control field, which will be described in detail hereinafter. For example, for convenience of discussion, according to an embodiment of the inventive concept, a compressed beamforming frame including two partial bandwidth information subfields in one MIMO control field will be taken as an example.

Specifically, although not shown in the drawing, the compressed beamforming frame may be included in payload (more specifically, a data field of payload) of a PPDU. The compressed beamforming frame may include an MIMO control field (that is, MIMO Control field).

The MIMO control field may further include a '2nd RU Start-End Index Present' subfield other than an 'Nc Index' subfield, an 'Nr Index' subfield, a 'BW' subfield, a 'Grouping' subfield, a 'Codebook Information' subfield, a 'Feedback Type' subfield, a 'Remaining Feedback Segments' subfield, a 'First Feedback Segment' subfield, an 'RU Start Index' subfield, an 'RU End Index' subfield, a 'Sounding Dialog Token Number' subfield, a 'Disallowed Subchannel Bitmap Present' subfield, a 'Reserved' subfield (arranged in front of a 'Disallowed Subchannel Bitmap' subfield), the 'Disallowed Subchannel Bitmap' subfield, and a 'Reserved' subfield (arranged behind the 'Disallowed Subchannel Bitmap' subfield).

Here, as illustrated in FIG. 18, some of the 'Nc Index' subfield, the 'Nr Index' subfield, the 'BW' subfield, the 'Grouping' subfield, the 'Codebook Information' subfield, the 'Feedback Type' subfield, the 'Remaining Feedback Segments' subfield, the 'First Feedback Segment' subfield, the 'RU Start Index' subfield, the 'RU End Index' subfield, the 'Sounding Dialog Token Number' subfield, the 'Disallowed Subchannel Bitmap Present' subfield, the 'Reserved' subfield (arranged in front of the 'Disallowed Subchannel Bitmap' subfield), the 'Disallowed Subchannel Bitmap' subfield, and the 'Reserved' subfield (arranged behind the 'Disallowed Subchannel Bitmap' subfield) may be configured in accordance with the 802.11ax standard and the others may be newly configured in accordance with the 802.11be standard or a standard derived from the 802.11be standard.

In particular, each of the 'RU Start Index' subfield and the 'RU End Index' subfield may include, for example, 8 bits in order to represent a bandwidth of up to 320 MHz in accordance with the 802.11be standard. Therefore, each of the 'RU Start Index' subfield and the 'RU End Index' subfield may include, for example, one of indexes 0 to 255. Each of the 'RU Start Index' subfield and the 'RU End Index' subfield may include bits (for example, 4 bits, 6 bits, or 7 bits) less than 8 bits.

In addition, the 'RU Start Index' subfield and the 'RU End Index' subfield may configure a partial bandwidth information subfield including subcarrier index information corresponding to a partial bandwidth designated as a channel feedback section of a corresponding receiving device. That is, the partial bandwidth information subfield may include a first partial bandwidth start index subfield including first subcarrier index information corresponding to the partial bandwidth and a first partial bandwidth end index subfield including last subcarrier index information corresponding to the partial bandwidth. In addition, the first partial bandwidth start index subfield may correspond to the 'RU Start Index' subfield and the first partial bandwidth end index subfield may correspond to the 'RU End Index' subfield.

In an embodiment, the '2nd RU Start-End Index Present' subfield includes 1 bit and indicates whether an additional partial bandwidth designated as the channel feedback section of the corresponding receiving device is provided except the partial bandwidth.

That is, in the compressed beamforming frame of FIG. 18, unlike in the HE compressed beamforming frame, the '2nd RU Start-End Index Present' subfield is further included and the receiving device may determine whether the additional partial bandwidth designated as the channel feedback section of the corresponding receiving device is using the '2nd RU Start-End Index Present' subfield.

Specifically, when the additional partial bandwidth designated as the channel feedback section of the corresponding receiving device is provided, a value of the '2nd RU Start-End Index Present' subfield may be '1' and, when the additional partial bandwidth designated as the channel feedback section of the corresponding receiving device is not provided, the value of the '2nd RU Start-End Index Present' subfield may be '0'.

Furthermore, when the additional partial bandwidth designated as the channel feedback section of the corresponding receiving device is provided, (that is, when the value of the '2nd RU Start-End Index Present' subfield is '1'), the MIMO control field may further include a '2nd RU Start Index' subfield and a '2nd RU End Index' subfield. On the other hand, when the additional partial bandwidth designated as the channel feedback section of the corresponding receiving device is not provided, (that is, when the value of the '2nd RU Start-End Index Present' subfield is '0'), only an 'RU Start Index' subfield and an 'RU End Index' subfield are included in the MIMO control field as partial bandwidth related index subfields.

Here, each of the '2nd RU Start Index' subfield and the '2nd RU End Index' subfield may include 8 bits in order to represent a bandwidth of up to 320 MHz in accordance with the 802.11be standard. Therefore, each of the '2nd RU Start Index' subfield and the '2nd RU End Index' subfield may include, for example, one of indexes 0 to 255. However, each of the '2nd RU Start Index' subfield and the '2nd RU End Index' subfield may include bits (for example, 4 bits, 6 bits, or 7 bits) less than 8 bits.

In addition, the '2nd RU Start Index' subfield and the '2nd RU End Index' subfield may configure an additional partial bandwidth information subfield including subcarrier index information corresponding to an additional partial bandwidth designated as a channel feedback section of a corresponding receiving device. That is, the additional partial bandwidth information subfield may include a second partial bandwidth start index subfield including first subcarrier index information corresponding to the additional partial bandwidth and a second partial bandwidth end index subfield including last subcarrier index information corresponding to the additional partial bandwidth. In addition, the second partial bandwidth start index subfield may correspond to the '2nd RU Start Index' subfield and the second partial bandwidth end index subfield may correspond to the '2nd RU End Index' subfield.

For reference, the '2nd RU Start Index' subfield and the '2nd RU End Index' subfield may be arranged behind the '2nd RU Start-End Index Present' subfield and may be provided in the MIMO control field.

Because the MIMO control field in the compressed beamforming frame according to an embodiment of the inventive concept is configured as described above, when the transmission device transmits the NDPA frame illustrated in one of FIGS. 9, 10, and 12 to the receiving device in which the multiple RUs including the plurality of partial bandwidths are designated as the channel feedback section, the corresponding receiving device may feedback only state information of a channel designated thereto to the transmission device by using the MIMO control field in the compressed beamforming frame illustrated in FIG. 18. Therefore, it is possible to prevent unnecessary overhead from increasing in a process of feeding back the channel state information.

As described above, an example of the MIMO control field in the compressed beamforming frame according to an embodiment of the inventive concept may be configured to support a multiple RU designation situation and the 802.11be standard (or a standard derived from the 802.11be standard).

Referring to FIG. 19, another example of the MIMO control field in the compressed beamforming frame according to an embodiment of the inventive concept is illustrated.

Unlike FIG. 18, FIG. 19 illustrates the compressed beamforming frame to which an RU allocation subfield is added instead of partial bandwidth information subfields (that is, partial bandwidth start/end index subfields) in order to include subcarrier index information items respectively corresponding to a plurality of partial bandwidths (two or more partial bandwidths each of which may include one RU or a set of a plurality of adjacent RUs; for example, the two 996 RUs of FIG. 8A configure one partial bandwidth) in the MIMO control field. That is, when the receiving device (for example, the station or the HE Beamformee) is requested by the transmission device (for example, the AP or the HE Beamformer) to transmit channel state information on multiple RUs through the NDPA frame, the compressed beamforming frame of FIG. 19 includes the RU allocation subfield indicating the channel feedback section of the corresponding receiving device in the MIMO control field, which will be described in detail hereinafter.

Although not shown in the drawing, the compressed beamforming frame may be included in payload (more specifically, a data field of payload) of a PPDU. The compressed beamforming frame may include an MIMO control field (that is, MIMO Control field).

The MIMO control field may further include an 'RU Allocation' subfield other than an 'Nc Index' subfield, an 'Nr Index' subfield, a 'BW' subfield, a 'Grouping' subfield, a 'Codebook Information' subfield, a 'Feedback Type' subfield, a 'Remaining Feedback Segments' subfield, a 'First Feedback Segment' subfield, a 'Sounding Dialog Token Number' subfield, a 'Disallowed Subchannel Bitmap Present' subfield, a 'Reserved' subfield (arranged in front of a 'Disallowed Subchannel Bitmap' subfield), the 'Disallowed Subchannel Bitmap' subfield, and a 'Reserved' subfield (arranged behind the 'Disallowed Subchannel Bitmap' subfield).

Here, as illustrated in FIG. 19, some of the 'Nc Index' subfield, the 'Nr Index' subfield, the 'BW' subfield, the 'Grouping' subfield, the 'Codebook Information' subfield, the 'Feedback Type' subfield, the 'Remaining Feedback Segments' subfield, the 'First Feedback Segment' subfield, the 'Sounding Dialog Token Number' subfield, the 'Disallowed Subchannel Bitmap Present' subfield, the 'Reserved' subfield (arranged in front of the 'Disallowed Subchannel Bitmap' subfield), the 'Disallowed Subchannel Bitmap' subfield, and the 'Reserved' subfield (arranged behind the 'Disallowed Subchannel Bitmap' subfield) may be configured in accordance with the 802.11ax standard and the others may be newly configured in accordance with the 802.11be standard.

In particular, the 'RU Allocation' subfield may include, for example, specific bits (for example, 9 bits). For example, the subfield may include the same bits as those of the 'RU Allocation' subfield of FIG. 12 in order to represent a bandwidth of up to 320 MHz in accordance with the 802.11be standard and may include index information of an RU designated as the channel feedback section of the corresponding receiving device. The index information of the RU may indicate a size and position of the corresponding RU.

If the bandwidth of 320 MHz is represented, the 'RU Allocation' subfield may include other bits (for example, bits no less than 10 bits or no more than 8 bits) than 9 bits. For example, when the size of the RU is set not set as the 26-tone RU but as the 242-tone RU, the 'RU Allocation' subfield may represent the bandwidth of 320 MHz only by 7 bits. According to an embodiment of the inventive concept, for convenience of discussion, it is illustrated that the 'RU Allocation' subfield includes 9 bits.

For example, the transmission device may determine subcarrier index information corresponding to corresponding index information based on the index information of the 'RU Allocation' subfield by using a mapping table stored therein. Here, the mapping table may include, for example, the tables described later with reference to FIGS. 14 to 16. However, the inventive concept is not limited thereto. In addition, the subcarrier index information (for example, the 'RU Start Index' and 'RU End Index' corresponding to the designated RU) corresponding to the index information of the 'RU Allocation' subfield commonly indicates subcarrier indexes in a designated RU range or may situationally indicate subcarrier indexes out of the designated RU range in order to avoid extra-interpolation.

As described above, in the compressed beamforming frame of FIG. 19, unlike in the HE compressed beamforming frame, the 'RU Allocation' subfield may be newly added instead of the 'RU Start Index' subfield and the 'RU End Index' subfield and the receiving device may display a section fed back by the corresponding receiving device using the 'RU Allocation' subfield.

Therefore, the transmission device (for example, the AP or the HE Beamformer) may determine the channel section fed back thereto based on the 'RU Allocation' subfield in the compressed beamforming frame received from the receiving device (for example, the station or the HE Beamformee).

Because the MIMO control field in the compressed beamforming frame according to an embodiment of the inventive concept is configured as described above, when the transmission device transmits the NDPA frame illustrated in one of FIGS. 9, 10, and 12 to the receiving device in which the multiple RUs including the plurality of partial bandwidths are designated as the channel feedback section, the corresponding receiving device may feedback only state information of a channel designated thereto to the transmission device by using the MIMO control field in the compressed beamforming frame illustrated in FIG. 19. Therefore, it is possible to prevent unnecessary overhead from increasing in a process of feeding back the channel state information.

As described above, the MIMO control field in the compressed beamforming frame according to an embodiment of the inventive concept may be configured to support a multiple RU designation situation and the 802.11be standard (or a standard derived from the 802.11be standard).

As described above, according to an embodiment of the inventive concept, by preventing unnecessary overhead from increasing in the process of feeding back the channel state information through an apparatus and a method for enabling a user to efficiently feedback the channel state information in the WLAN system, a data transfer rate may increase.

FIG. 20 is a table illustrating values of a sounding dialog token field according to an embodiment of the inventive concept. Specifically, the table of FIG. 20 represents values of some bits of the Sounding Dialog Token field included in the NDPA frame described above with reference to FIG. 5 and versions of the NDPA frame corresponding to the values. In some embodiments, 'Ranging' and 'HE/VHT' of FIG. 20 may correspond to 'B0 (the LSB) and B1' of the Sounding Dialog Token field.

As described above, the 2 bits of the Sounding Dialog Token field may represent the standard of the NDPA frame. For example, as illustrated in FIG. 20, 2 bits '00' may represent a VHT NDPA frame, 2 bits '01' may represent an HE NDPA frame, 2 bits '10' may represent a Ranging NDPA frame (or a 802.11az NDPA frame) and 2 bits '11' may represent an EHT NDPA frame. Therefore, there are limitations on representing versions of the NDPA frame for arbitrary next generation standards (hereinafter, EHT+) subsequent to EHT, that is, the 802.11be standard by using the 2 bits of the Sounding Dialog Token field and a new method of representing a version of the NDPA frame may be required. For this purpose, as described later with reference to FIGS. 22, 25, and 27, the NDPA frame may include an NDPA version subfield representing the version (that may be referred to as an NDPA version herein) of the NDPA frame.

Figure 21:
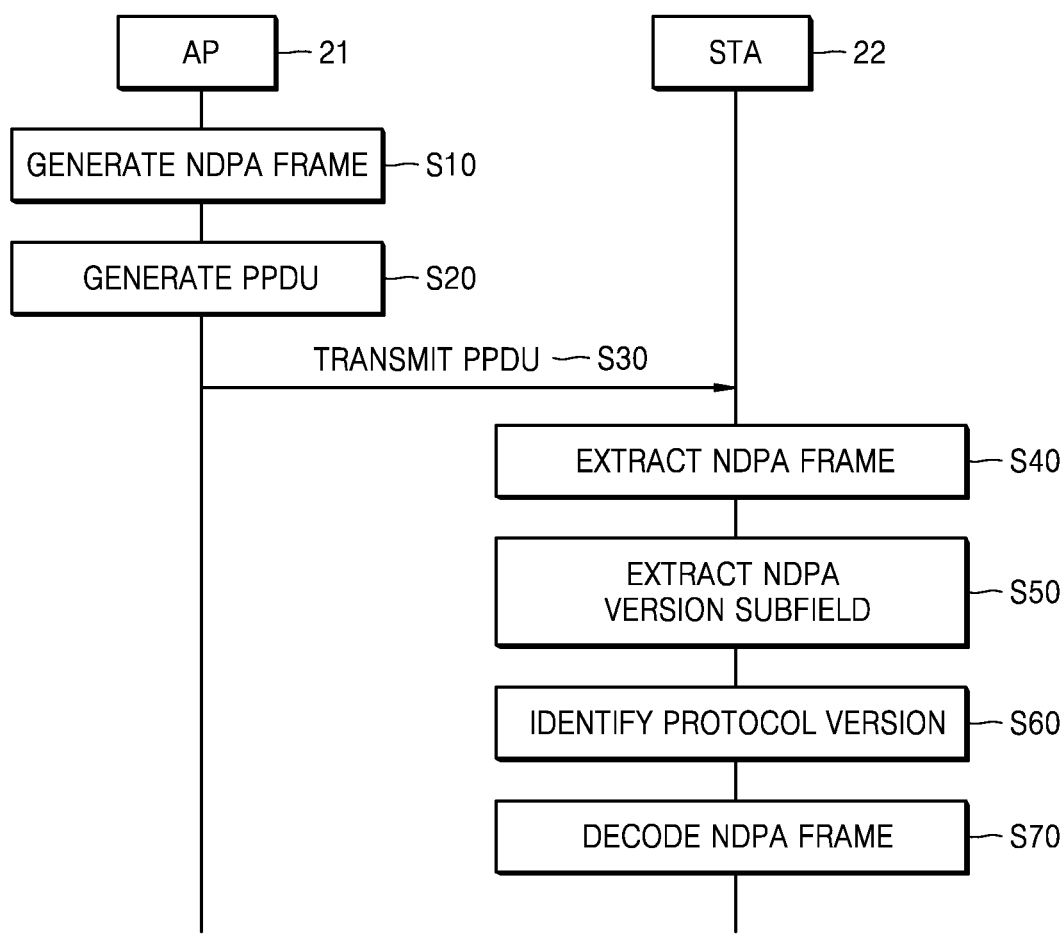
FIG. 21 is a message view illustrating a wireless communication method based on an enhanced NDPA frame according to an exemplary embodiment of the inventive concept.

FIG. 21 is a message view illustrating a wireless communication method based on an enhanced NDPA frame according to an exemplary embodiment of the inventive concept. Specifically, the message view of FIG. 21 illustrates operations of an AP 21 providing the NDPA frame and a station 22 receiving the NDPA frame. Herein, an apparatus for providing the NDPA frame like the AP 21 may be referred to as a first apparatus and an apparatus for obtaining the NDPA frame like the station 22 may be referred to as a second apparatus.

Referring to FIG. 21, in operation S10, the AP 21 generates the NDPA frame. As described above with reference to FIG. 20, the NDPA frame includes the NDPA version subfield. The AP 21 may generate the NDPA version subfield and the NDPA frame including the NDPA version subfield. Examples of operation S10 will be described later with reference to FIGS. 23A, 26A, and 28A.

In operation S20, the AP 21 generates a PPDU. For example, the AP 21 may generate a PPDU having a payload including the NDPA frame generated in operation S10. In operation S30, the AP 21 transmits the PPDU and the station 22 receives the PPDU.

In operation S40, the station 22 extracts the NDPA frame. For example, the station 22 may extract the NDPA frame from the payload of the PPDU received in operation S30. An example of a structure of the PPDU will be described later with reference to FIG. 30A.

In operation S50, the station 22 may extract the NDPA version subfield. For example, the station 22 extracts the NDPA version subfield from the NDPA frame extracted in operation S40. As described later with reference to the drawings, the NDPA version subfield may be variously included in the NDPA frame and examples of operation S50 will be described later with reference to FIGS. 23B, 26B, and 28B.

In operation S60, the station 22 identifies a protocol version (for example, the 802.11 standard). For example, the station 22 may identify a protocol version (for example, EHT or EHT+) corresponding to a value of the NDPA version subfield extracted in operation S50.

In operation S70, the station 22 decodes the NDPA frame. For example, the station 22 may decode the NDPA frame based on the protocol version identified in operation S60. In some embodiments, the NDPA frame may have a structure (for example, field configurations) that varies in accordance with the protocol version and the station 22 may correctly identify information included in the NDPA frame by decoding the NDPA frame based on the identified protocol version.

Figure 22:
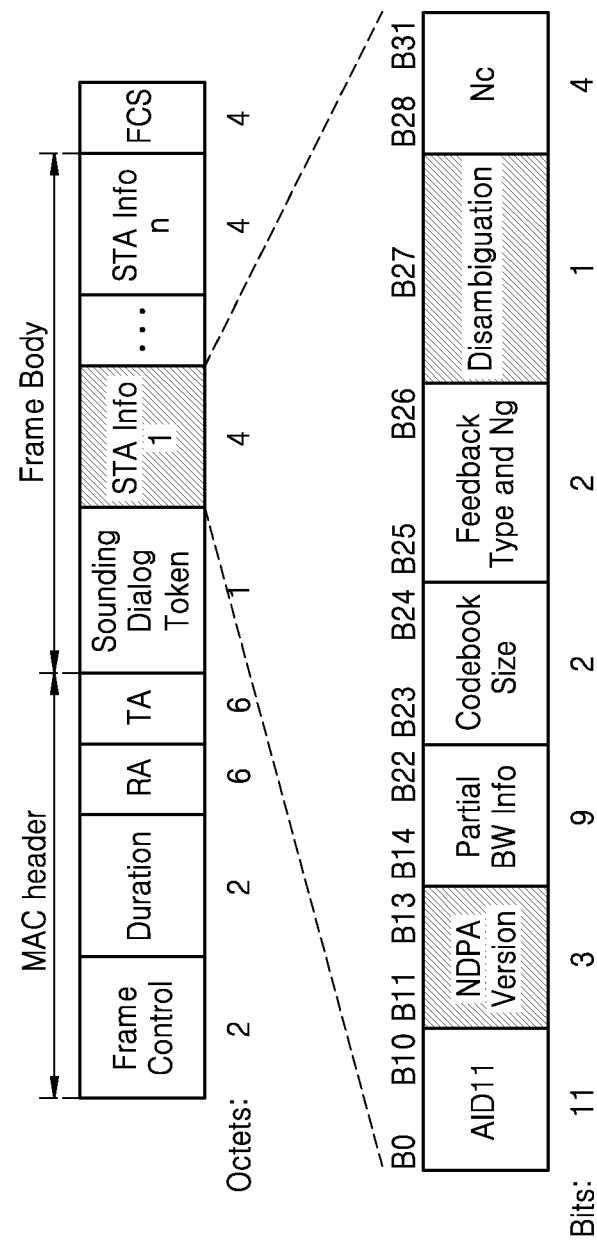
FIG. 22 is a view illustrating a structure of an NDPA frame according to an exemplary embodiment of the inventive concept.

FIG. 22 is a view illustrating a structure of an NDPA frame according to an exemplary embodiment of the inventive concept. Specifically, FIG. 22 illustrates the NDPA frame and STA information fields included in the NDPA frame. In some embodiments, the NDPA frame of FIG. 22 may be used for EHT or EHT+. Hereinafter, description previously given with reference to FIG. 22 will be omitted.

As illustrated in FIG. 22, the NDPA frame may include an MAC header, a frame body, and an FCS field. The NDPA frame may include a frame control field, a duration field, an RA field, and a TA field in the MAC header and a sounding dialog field and n STA information fields in the frame body, where n is an integer greater than 0. In an example of FIG. 22, the NDPA version subfield may be included in the STA information fields in the frame body of the NDPA frame. In some embodiments, the NDPA frame may have field configurations and/or lengths different from those illustrated in FIG. 22.

In an embodiment, the STA information field has a 4-byte length and includes an 'AID11' subfield, an 'NDPA version' subfield (or an NDPA version subfield), an 'Partial BW Info' subfield, a 'Codebook Size' subfield, a 'Feedback Type and Ng' subfield, a 'Disambiguation' subfield, and an 'Nc' subfield. In some embodiments, the STA information field may have subfield configurations and/or lengths different from those illustrated in FIG. 22. For example, the STA information field may have a 2 k-byte length, where k is an integer greater than 0. In addition, the 'NDPA version' subfield may be arranged in a position different from that illustrated in FIG. 22.

The STA information field may include the 9-bit 'Partial BW Info' subfield and the 3-bit 'NDPA version' subfield in comparison with the STA information field described above with reference to FIGS. 5, 9, and 10. The 'NDPA version' subfield may have a value representing the protocol version. Examples of a wireless communication method based on the NDPA frame of FIG. 22 will be described later with reference to FIGS. 23A and 23B.

Figure 23A:
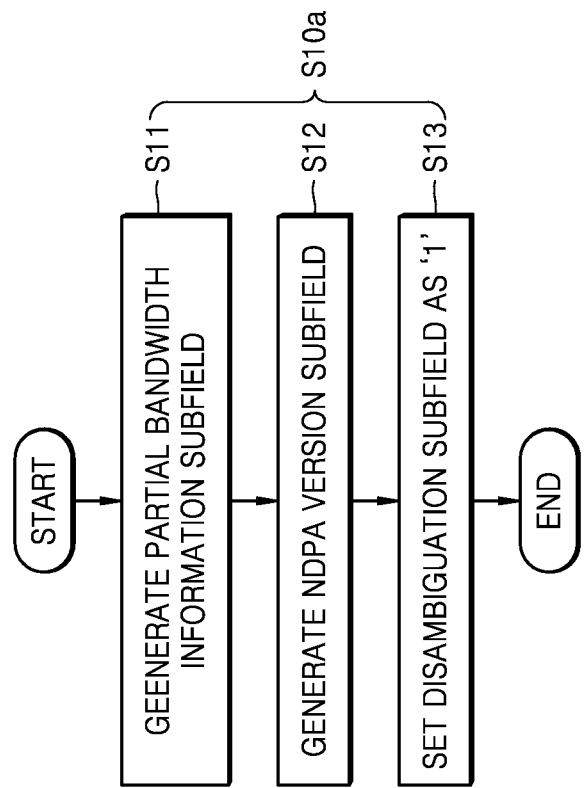
FIGS. 23A and 23B are flowcharts illustrating a wireless communication method based on an enhanced NDPA according to an exemplary embodiment of the inventive concept.
Figure 23B:
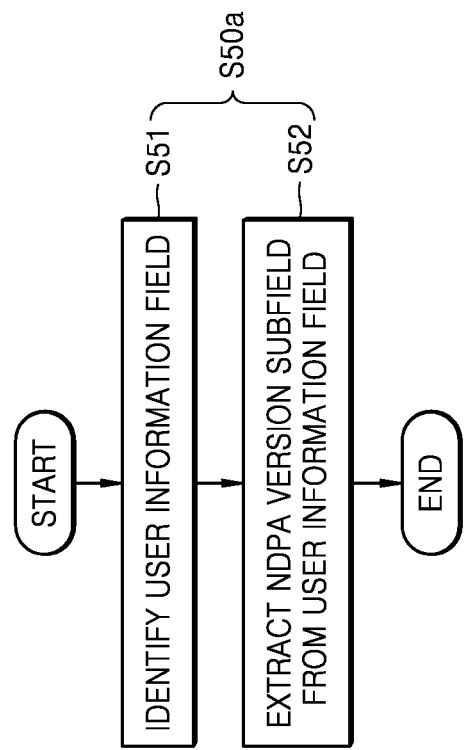

FIGS. 23A and 23B are flowcharts illustrating a wireless communication method based on an enhanced NDPA according to an exemplary embodiment of the inventive concept. Specifically, the flowchart of FIG. 23A illustrates an example of operation S10 of FIG. 21 and the flowchart of FIG. 23B illustrates an example of operation S50 of FIG. 21. In some embodiments, operation S10a of FIG. 23A and operation S50a of FIG. 23B may be based on the STA information field including the NDPA version subfield as described above with reference to FIG. 22. In some embodiments, operation S10a of FIG. 23A may be performed by the AP 21 of FIG. 21 and operation S50a of FIG. 23B may be performed by the station 22 of FIG. 21. Hereinafter, FIGS. 23A and 23B will be described with reference to FIGS. 21 and 22.

Referring to FIG. 23A, in operation S10a, the AP 21 generates the STA information field included in the NDPA frame. As illustrated in FIG. 23A, operation S10a includes operation S11, operation S12, and operation S13. In some embodiments, operation S11, operation S12, and operation S13 may be performed in the order different from that illustrated in FIG. 23A and at least two of operation S11, operation S12, and operation S13 may be performed in parallel.

In operation S11, a partial bandwidth information subfield is generated. For example, the AP 21 may generate the 9-bit partial bandwidth information subfield as described above with reference to FIG. 22. In some embodiments, the 9-bit partial bandwidth information subfield may have a format defined by the EHT, that is, the 802.11be standard.

In operation S12, the NDPA version subfield is generated. For example, the AP 21 may generate the 3-bit partial bandwidth information subfield as described above with reference to FIG. 22. In some embodiments, as described later with reference to FIG. 30A, the NDPA version subfield may have the same format as that of a 'PHY Version ID' subfield included in a preamble of the PPDU. In some embodiments, as described later with reference to FIG. 30B, the NDPA version subfield may include at least one bit representing a major version and at least one bit representing a minor version of a protocol.

In operation S13, a disambiguation subfield is set as '1'. As described above, in order to prevent VHT stations identifying the STA information field of a 2-byte length from wrongly identifying the STA information field having a length of no less than 4 bytes in the HE, the EHT, or the EHT+, the 'Disambiguation' subfield may be provided in a position corresponding to 'B10' of the 'AID11' subfield and may be set to have a value of '1'. For example, as illustrated in FIG. 22, the 'Disambiguation' subfield may be positioned in 'B27' of the STA information subfield and the AP 21 may set the 'Disambiguation' subfield as '1'.

Referring to FIG. 23B, in operation S50a, the station 22 extracts the NDPA version subfield. As illustrated in FIG. 23B, operation S50a includes operation S51 and operation S52. In some embodiments, operation S51 and operation S52 may be performed in the order different from that illustrated in FIG. 23B or may be performed in parallel.

In operation S51, a user information field is identified. For example, the station 22 may identify the STA information field generated by the AP 21 for the station 22 among the one or more STA information fields included in the NDPA frame. An example of operation S51 will be described later with reference to FIG. 24.

In operation S52, the NDPA version subfield is extracted from the user information field. For example, the station 22 may extract the NDPA version subfield from the user information field identified in operation S51. As described above with reference to FIG. 22, the NDPA version subfield may be provided in a predetermined position in the STA information field and the station 22 may extract the NDPA version subfield from the STA information field.

Figure 24:
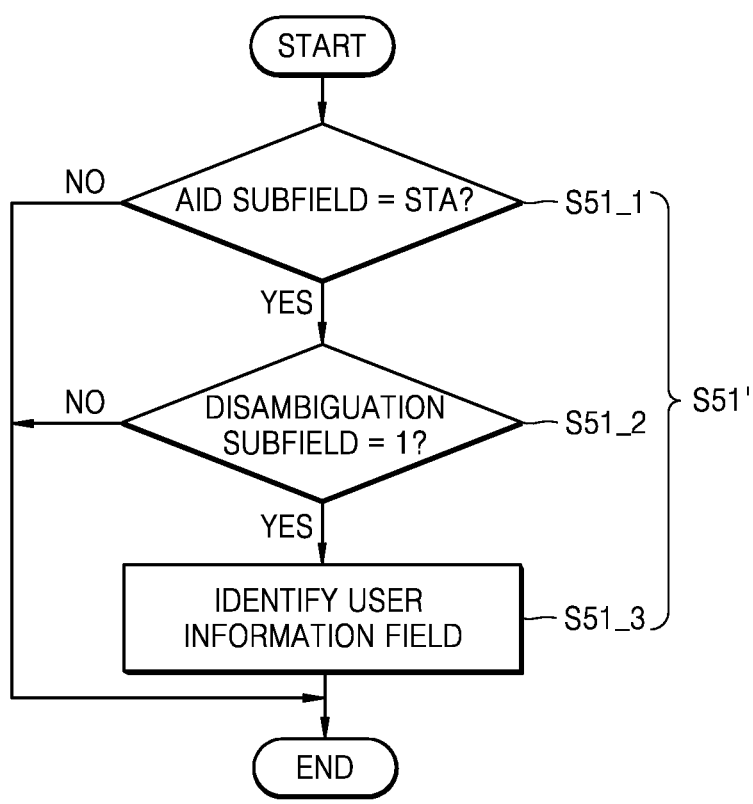
FIG. 24 is a flowchart illustrating a wireless communication method based on an enhanced NDPA according to an exemplary embodiment of the inventive concept.

FIG. 24 is a flowchart illustrating a wireless communication method based on an enhanced NDPA according to an exemplary embodiment of the inventive concept. Specifically, the flowchart of FIG. 24 illustrates an example of operation S51 of FIG. 23B. As described above with reference to FIG. 23B, in operation S51' of FIG. 24, the user information field is identified. As illustrated in FIG. 24, operation S51' includes operation S51_1, operation S51_2, and operation S51_3. In some embodiments, operation S51' may be performed by the station 22 of FIG. 21 and FIG. 24 will be described hereinafter with reference to FIGS. 21 and 22.

Referring to FIG. 24, in operation S51_1, it is determined whether a value of the AID subfield is the same as that of the AID, that is, the STA of the station 22. For example, in order to identify the STA information field including the AID subfield having the same value as that of the AID of the station 22, which is provided by the AP 21, the station 22 compares a value of the 'AID11' subfield included in the STA information field with that of the AID of the station 22. As illustrated in FIG. 24, when it is determined that the value of the AID subfield is the same as that of the AID of the station 22, operation S51_2 is subsequently performed. On the other hand, when it is determined that the value of the AID subfield is not the same as that of the AID of the station 22, operation S51' is terminated. In some embodiments, operation S51_2 may be omitted and, when it is determined in operation S51_1 that the value of the AID subfield is the same as that of the AID of the station 22, operation S51_3 may be subsequently performed.

In operation S51_2, it is determined whether a value of the disambiguation subfield is '1'. For example, as described above with reference to FIG. 22, because the value of 'Disambiguation' subfield is '1' in the standards (for example, the HE, the EHT, and the EHT+) subsequent to the VHT, the value of 'Disambiguation' subfield may be '1' in the STA information field including the NDPA version subfield. Therefore, the station 22 may verify the value of the 'Disambiguation' subfield in the STA information field.

As illustrated in FIG. 24, when it is determined that the value of the disambiguation subfield is '1', operation S51_3 may be subsequently performed. On the other hand, when it is determined that the value of the disambiguation subfield is not '1', operation S51' may be terminated. Finally, when the user information field is not identified in operation S51', that is, when operation S51_3 is not performed in operation S51', the station 22 may perform operation S51' again for another STA information field included in the NDPA frame.

Figure 25:
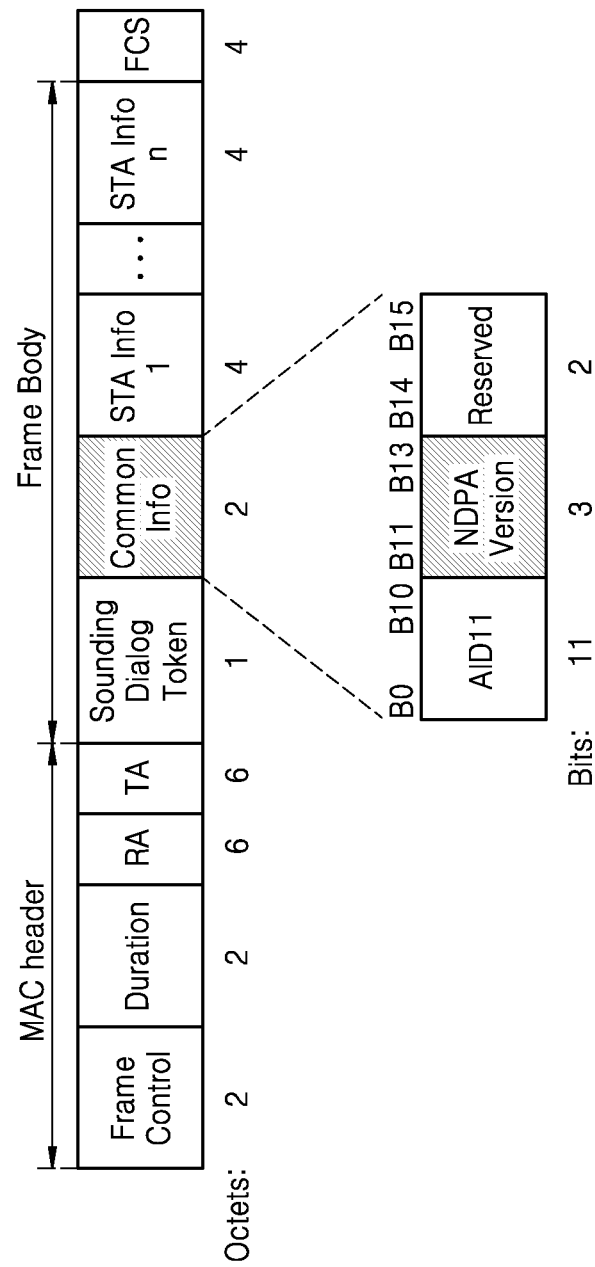
FIG. 25 is a view illustrating a structure of an NDPA frame according to an exemplary embodiment of the inventive concept.

FIG. 25 is a view illustrating a structure of an NDPA frame according to an exemplary embodiment of the inventive concept. Specifically, FIG. 25 illustrates the NDPA frame and a common information field included in the NDPA frame. In some embodiments, the NDPA frame of FIG. 25 may be used for the EHT or the EHT+. Hereinafter, description previously given with reference to FIG. 25 will be omitted.

As illustrated in FIG. 25, the NDPA frame may include an MAC header, a frame body, and an FCS field. The NDPA frame may include a frame control field, a duration field, an RA field, and a TA field in the MAC header and a sounding dialog field, a common information field, and n STA information fields in the frame body, where n is an integer greater than 0. In the example shown in FIG. 25, the NDPA version subfield may be included in the common information field in the frame body of the NDPA frame. In some embodiments, the NDPA frame may have field configurations and/or lengths different from those illustrated in FIG. 25.

In an embodiment, the common information field has a 2-byte length and includes an 'AID11' subfield and an 'NDPA version' subfield. In some embodiments, the common information field may have subfield configurations and/or lengths different from those illustrated in FIG. 25. For example, the common information field may have a 2 k-byte length (k is an integer greater than 0). In addition, the 'NDPA version' subfield may be arranged in a position different from that illustrated in FIG. 25.

The common information field may include common information for one or more subsequent STA information fields. For example, a protocol version represented by the 'NDPA version' subfield included in the common information field may be common to the one or more STA information fields subsequent to the common information field. Therefore, the at least one STA information field may have a structure based on the protocol version corresponding to the value of the 'NDPA version' subfield of the common information field. Therefore, in comparison with the NDPA frame of FIG. 22, when the NDPA frame includes a plurality of STA information fields, redundancy of the 'NDPA version' subfield may be reduced.

The value of the 'AID11' subfield of the common information field may be set so that the station supporting legacy protocol versions in which the common information field is not defined, for example, the VHT or the HE does not wrongly identify the common information field as the STA information field. For example, the 'AID11' subfield included in the common information field may have a reserved value in the legacy protocol versions.

Figure 26A:
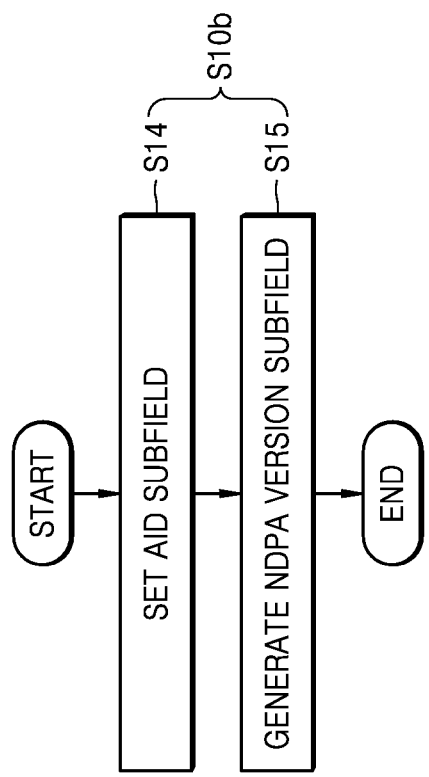

FIGS. 26A and 26B are flowcharts illustrating a wireless communication method based on an enhanced NDPA according to exemplary embodiments of the inventive concept. Specifically, the flowchart of FIG. 26A illustrates an example of operation S10 of FIG. 21 and the flowchart of FIG. 26B illustrates an example of operation S50 of FIG. 21. In some embodiments, operation $S10_b$ of FIG. 26A and operation $S50_b$ of FIG. 26B may be based on the common information field including the NDPA version subfield as described above with reference to FIG. 25. In some embodiments, operation S10b of FIG. 26A may be performed by the AP 21 of FIG. 21 and operation S50b of FIG. 26B may be performed by the station 22 of FIG. 21. Hereinafter, FIGS. 26A and 26B will be described with reference to FIGS. 21 and 25.

Referring to FIG. 26A, in operation S10b, the AP 21 generates the common information field included in the NDPA frame. As illustrated in FIG. 26A, operation S10b includes operation S14 and operation S15. In some embodiments, operation S14 and operation S15 may be performed in the order different from that illustrated in FIG. 26A or may be performed in parallel.

In operation S14, an operation of setting the AID subfield is performed. For example, the AP 21 may set the 'AID11' subfield included in the common information field to have an invalid value in the 'AID11' subfield of the STA information field. In some embodiments, as described above with reference to FIG. 25, the AP 21 may set the 'AID11' subfield included in the common information field to have a reserved value, for example, one of values of 2008 to 2044 in the VHT and the HE in order to prevent the station supporting the VHT and/or the HE from wrongly identifying the common information field as the STA information field.

In operation S15, the NDPA version subfield is generated. For example, the AP 21 may generate the 3-bit partial bandwidth information subfield as described above with reference to FIG. 25. In some embodiments, as described later with reference to FIG. 30A, the NDPA version subfield may have the same format as that of the 'PHY Version ID' subfield included in the preamble of the PPDU. In some embodiments, as described later with reference to FIG. 30B, the NDPA version subfield may include at least one bit representing a major version and at least one bit representing a minor version of a protocol.

Referring to FIG. 26B, in operation S50b, the station 22 extracts the NDPA version subfield. As illustrated in FIG. 26B, operation S50b includes operation S53 and operation S54. In some embodiments, operation S53 and operation S54 may be performed in the order different from that illustrated in FIG. 26B or may be performed in parallel.

In operation S53, the common information field is identified. For example, the station 22 may identify the common information field based on the value of the AID subfield. As described above, the common information field may include the 'AID11' subfield having a unique value and the station 22 may identify a field including the 'AID11' subfield having the value corresponding to the common information field as the common information field.

In operation S54, the NDPA version subfield is extracted from the common information field. For example, the station 22 may extract the NDPA version subfield from the common information field identified in operation S53. As described above with reference to FIG. 25, the NDPA version subfield may be provided in a predetermined position in the common information field and the station 22 may extract the NDPA version subfield from the common information field. In some embodiments, the station 22 may decode the STA information field based on the value of the extracted NDPA version subfield.

Figure 27:
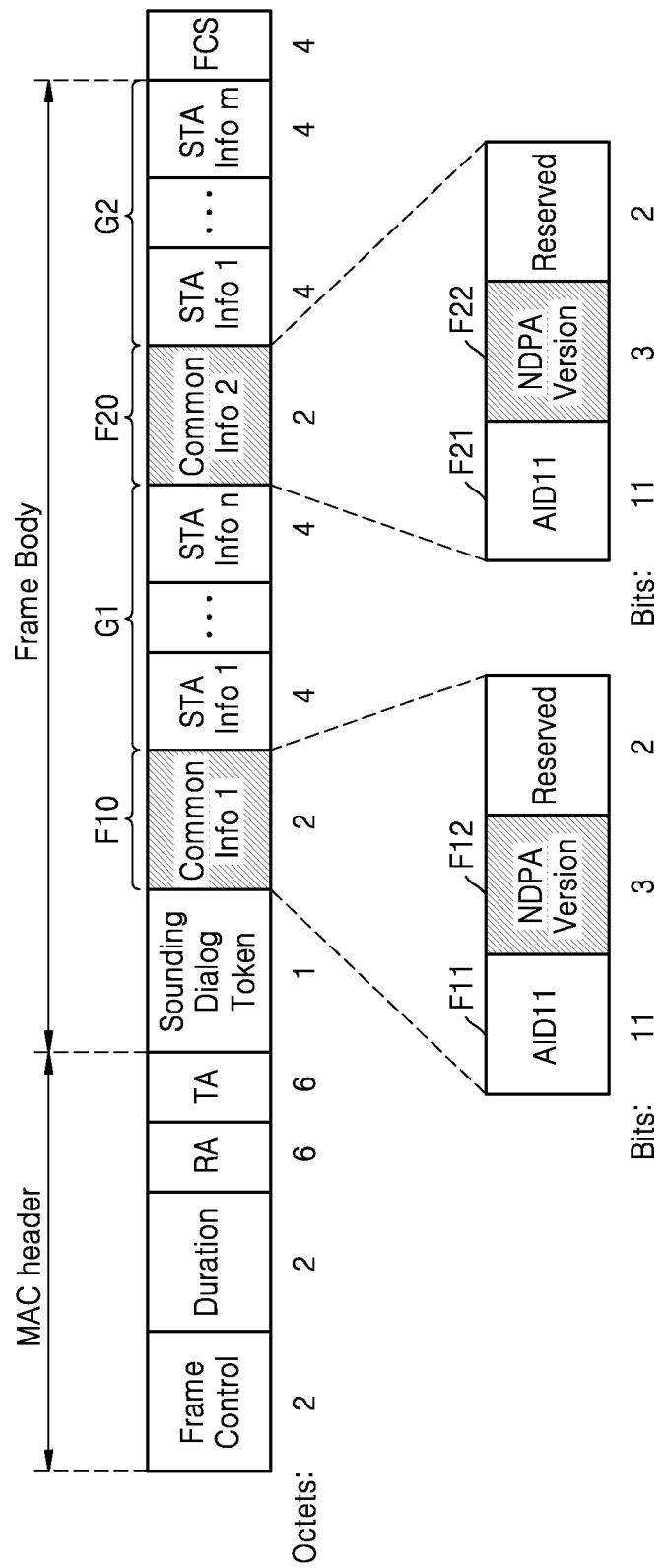
FIG. 27 is a view illustrating a structure of an NDPA frame according to an exemplary embodiment of the inventive concept.

FIG. 27 is a view illustrating a structure of an NDPA frame according to an exemplary embodiment of the inventive concept. Specifically, FIG. 27 illustrates the NDPA frame and the common information field included in the NDPA frame. In some embodiments, the NDPA frame of FIG. 27 may be used for EHT or EHT+. Hereinafter, description previously given with reference to FIG. 25 will be omitted.

As illustrated in FIG. 27, the NDPA frame may include an MAC header, a frame body, and an FCS field. The NDPA frame may include a frame control field, a duration field, an RA field, and a TA field in the MAC header and a sounding dialog field, a first common information field F10, n STA information fields G1, a second common information field F20, and m STA information fields G2 in the frame body, where m and n are integers greater than 0. In an example of FIG. 27, the NDPA version subfield is included in the common information fields, that is, the first common information field F10 and the second common information field F20 in the frame body of the NDPA frame. In some embodiments, the NDPA frame may include three or more common information fields unlike that illustrated in FIG. 27.

The NDPA frame may include a plurality of common information fields in comparison with the NDPA frame of FIG. 25. For example, as illustrated in FIG. 27, the NDPA frame may include the first common information field F10 and the second common information field F20. The common information field may include common information in one or more subsequent user information fields. For example, as illustrated in FIG. 27, the first common information field F10 may include common information in the n STA information fields G1 and the second common information field F20 may include common information in the m STA information fields. As illustrated in FIG. 27, the first common information field F10 may include an 'AID11' subfield F11 and an 'NDPA version' subfield F12 and the second common information field F20 may include an 'AID11' subfield F21 and an 'NDPA version' subfield F22. In some embodiments, the first common information field F10 and the second common information field F20 may have subfield configurations and/or lengths different from those illustrated in FIG. 27.

In some embodiments, the first common information field F10 and the second common information field F20 may be respectively represented in different protocol versions. For example, the first common information field F10 may include the 'NDPA version' subfield F12 having a value corresponding to the EHT and the second common information field F20 may include the 'NDPA version' subfield F22 having a value corresponding to the EHT+. Therefore, the n STA information fields G1 subsequent to the first common information field F10 may have a format based on the EHT, and the m STA information fields G2 subsequent to the second common information field F20 may have a format based on the EHT+. Therefore, in the NDPA frame of FIG. 27, the STA information fields may be grouped by the common information field.

Figure 28A:
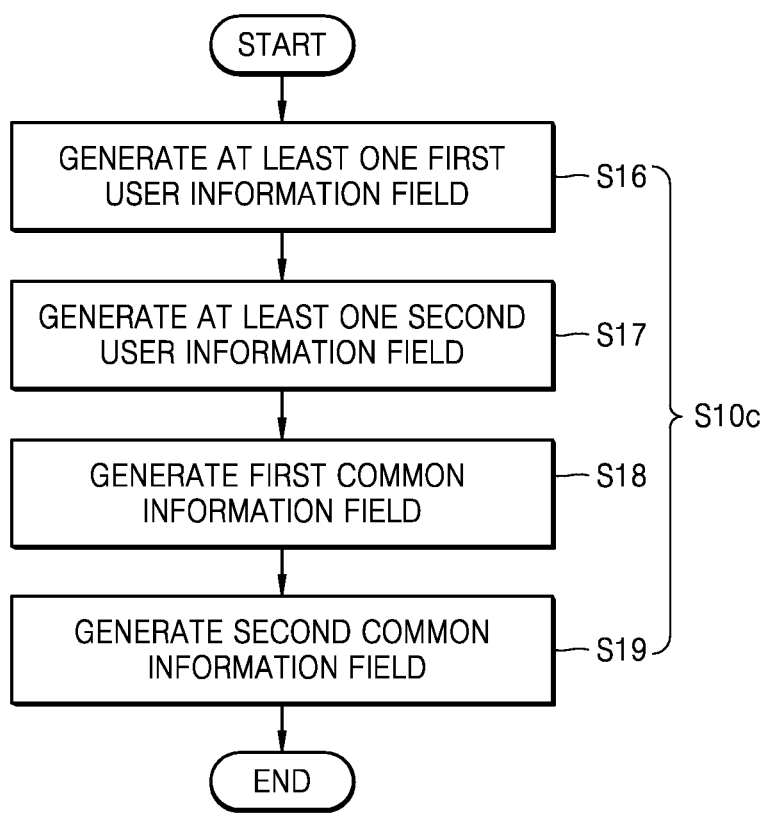

FIGS. 28A and 28B are flowcharts illustrating a wireless communication method based on an enhanced NDPA according to exemplary embodiments of the inventive concept. Specifically, the flowchart of FIG. 28A illustrates an example of operation S10 of FIG. 21 and the flowchart of FIG. 28B illustrates an example of operation S50 of FIG. 21. In some embodiments, operation S10c of FIG. 28A and operation S50c of FIG. 28B may be based on a plurality of common information fields respectively including NDPA version subfields. In some embodiments, operation S10c of FIG. 28A may be performed by the AP 21 of FIG. 21 and operation S50c of FIG. 28B may be performed by the station 22 of FIG. 21. Hereinafter, FIGS. 28A and 28B will be described with reference to FIGS. 21 and 27.

Referring to FIG. 28A, in operation S10c, the AP 21 generates the common information field included in the NDPA frame. As illustrated in FIG. 28A, operation S10c includes a plurality of operations S16 to S19. In some embodiments, the plurality of operations S16 to S19 may be performed in the order different from that illustrated in FIG. 26A and at least two of the plurality of operations S16 to S19 may be performed in parallel.

In operation S16, at least one first user information field is generated and the at least one first user information field may correspond to a first protocol version. For example, the AP 21 may generate at least one first STA information field for at least one station supporting the EHT.

In operation S17, at least one second user information field is generated and the at least one second user information field may correspond to a second protocol version. For example, the AP 21 may generate at least one second STA information field for at least one station supporting the EHT+.

In operation S18, the first common information field is generated. For example, the AP 21 may generate the first common information field including common information in the at least one first user information field corresponding to the EHT. Therefore, as described above with reference to FIG. 27, the first common information field may include the 'NDPA version' subfield having a value corresponding to the EHT. In addition, the AP 21 may generate the NDPA frame so that the at least one first user information field may be subsequent to the first common information field.

In operation S19, the second common information field is generated. For example, the AP 21 may generate the second common information field including common information in the at least one second user information field corresponding to the EHT+. Therefore, as described above with reference to FIG. 27, the second common information field may include the 'NDPA version' subfield having a value corresponding to the EHT+. In addition, the AP 21 may generate the NDPA frame so that the at least one second user information field may be subsequent to the second common information field.

In some embodiments, the value of the 'AID11' subfield included in the first common information field may be different from that of the 'AID11' subfield included in the second common information field. For example, the AP 21 may set the value of the 'AID11' subfield included in the first common information field as a first value among reserved values in legacy protocol versions and may set the value of the 'AID11' subfield included in the second common information field as a second value among reserved values in legacy protocol versions. In some embodiments, the AP 21 may set the value of the 'AID11' subfield as well as the value of the 'NDPA version' subfield in accordance with a protocol version.

Referring to FIG. 28B, in operation S50c, the station 22 extracts the NDPA version subfield. As illustrated in FIG. 28B, operation S50c includes operation S55 and operation S56. In some embodiments, operation S55 and operation S56 may be performed in an order different from that illustrated in FIG. 28B or may be performed in parallel.

In operation S55, the common information field is identified. For example, the station 22 may identify the common information field including information for the station 22 among the plurality of common information fields included in the NDPA frame. An example of operation S55 will be described later with reference to FIG. 29.

In operation S56, the NDPA version subfield is extracted from the common information field. For example, the station 22 may extract the NDPA version subfield from the common information field identified in operation S55. As described above with reference to FIG. 27, the NDPA version subfield may be provided in a predetermined position in the common information field and the station 22 may extract the NDPA version subfield from the common information field. In some embodiments, the station 22 may decode the STA information field based on the value of the extracted NDPA version subfield.

Figure 29:
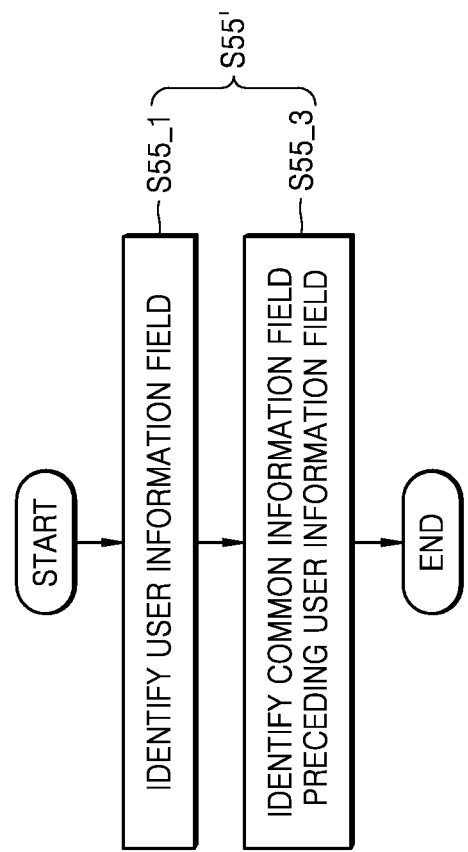
FIG. 29 is a flowchart illustrating a wireless communication method based on an enhanced NDPA according to an exemplary embodiment of the inventive concept.

FIG. 29 is a flowchart illustrating a wireless communication method based on an enhanced NDPA according to an exemplary embodiment of the inventive concept. Specifically, the flowchart of FIG. 29 illustrates an example of operation S55 of FIG. 28B. As described above with reference to FIG. 28B, in operation S55' of FIG. 29, the common information field is identified. As illustrated in FIG. 29, operation S55' includes operation S55_1 and operation S55_2. In some embodiments, operation S55' may be performed by the station 22 of FIG. 21 and FIG. 29 will be described hereinafter with reference to FIGS. 21 and 27.

Referring to FIG. 29, a user information field is identified in operation S55_1. In some embodiments, the station 22 may identify the user information field by performing operation S51' of FIG. 24.

In operation S55_3, the common information field preceding the user information field is identified. For example, the station 22 may identify the common information field preceding the user information field identified in the NDPA frame in operation S55_1. The station 22 may extract information from the identified common information field and may perform channel sounding based on the extracted information and information included in the user information field.

Figure 30A:
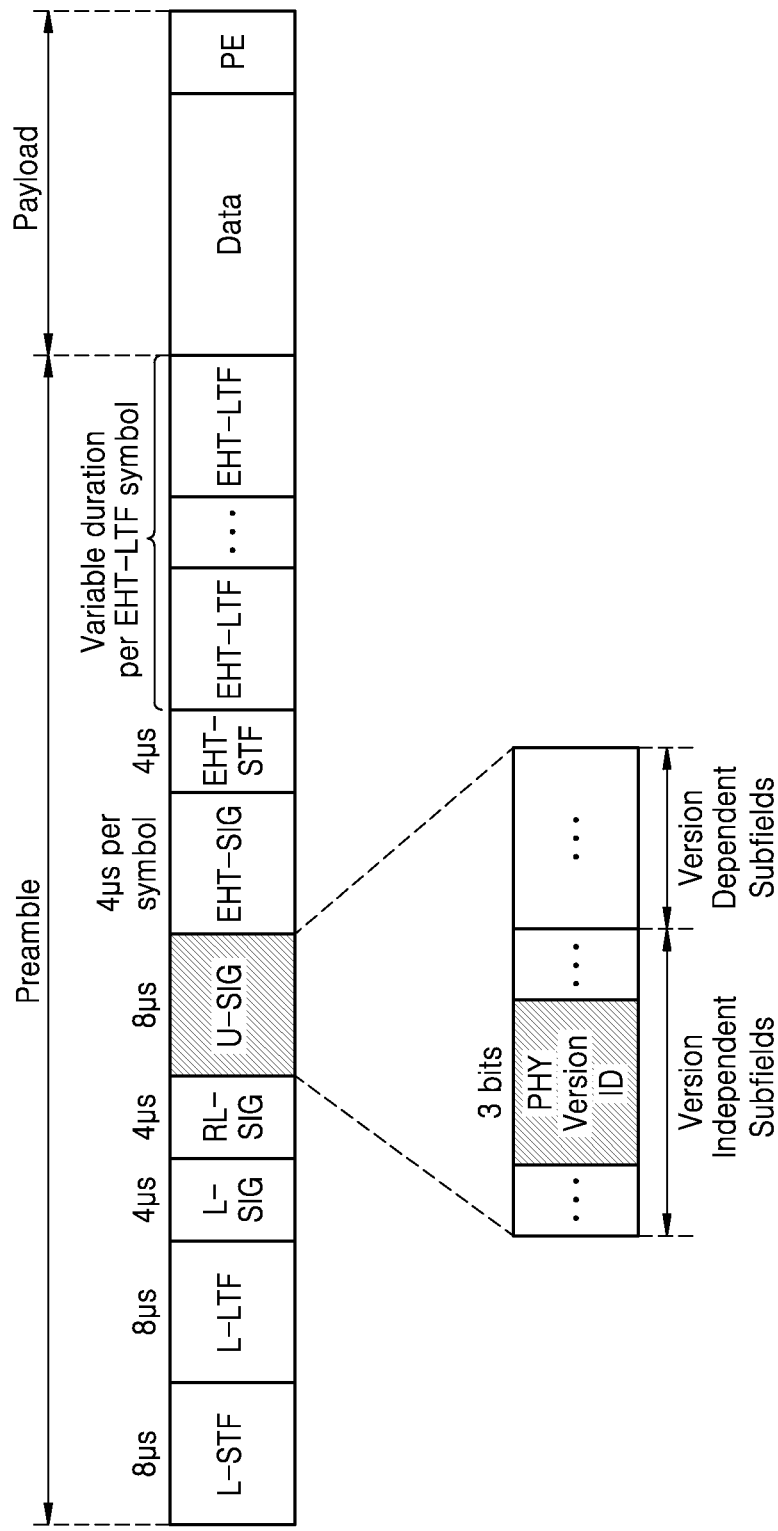
FIGS. 30A and 30B are views illustrating examples of an NDPA version subfield according to an exemplary embodiment of the inventive concept.
Figure 30B:
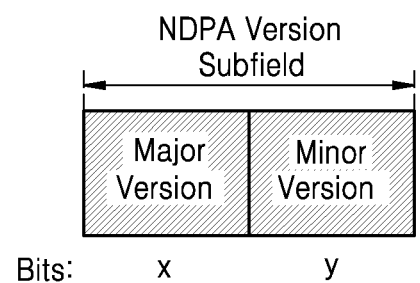

FIGS. 30A and 30B are views illustrating examples of an NDPA version subfield according to an exemplary embodiment of the inventive concept. Specifically, FIG. 30A illustrates a PPDU and a universal signal (U-SIG) field included in the PPDU and FIG. 30B illustrates an exemplary format of the NDPA version subfield.

Referring to FIG. 30A, in an embodiment, the NDPA version subfield has the same format as that of the 'PHY Version ID' subfield included in the preamble of the PPDU. For example, as illustrated in FIG. 30A, an EHT MU (multi-user) PPDU may include a preamble including training fields and signaling fields and payload including a data field. The EHT MU PPDU may include a legacy-short training field (L-STF), a legacy-long training field (L-LTF), a legacy-signal (L-SIG) field, a repeated legacy-signal (RL-SIG) field, the universal signal (U-SIG) field, an extremely high throughput-signal (EHT-SIG) field, an extremely high throughput-short training field (EHT-STF), and an extremely high throughput-long training field (EHT-LTF) in the preamble. In addition, the EHT MU PPDU may include a data field and a packet extension (PE) field in the payload.

The L-STF may include a short training orthogonal frequency-division multiplexing (OFDM) symbol and may be used for frame detection, automatic gain control (AGC), diversity detection, and coarse frequency/time synchronization. The L-LTF may include a long training OFDM symbol and may be used for fine frequency/time synchronization and channel estimation. The L-SIG field may be used for control information transmission and may include information on a data rate and a data length. In some embodiments, the L-SIG field may be repeated in the RL-SIG field.

The U-SIG field may include common control information in at least one station receiving the EHT MU PPDU and may correspond to HE-SIG-A of the HE. For example, the U-SIG field may further include subfields independent from the protocol version and subfields dependent on the protocol version as illustrated in FIG. 30A and may further include subfields and reserved bits respectively corresponding to a cyclic redundancy check (CRC) and tail. The subfields independent from the protocol version may have a static position and bit definition in different generations and/or physical versions. For example, the U-SIG field may include the 'PHY version ID' subfield as one of the subfields independent from the protocol version. In addition, the U-SIG field may include subfields respectively corresponding to punctured channel display, a PPDU type and compression mode, modulation and coding scheme (MCS) applied to the EHT-SIG field, and the number of EHT-SIG symbols.

In some embodiments, the NDPA version field may have the same format as that of the 'PHY version ID' subfield included in the U-SIG. For example, the NDPA version field may have a 3-bit length and may include a binary number '000' in order to represent the EHT and the 'NDPA version' subfield representing the EHT+ may have a value greater than the binary number '000'.

The EHT-SIG field may have variable MCS and length and may correspond to HE-SIG-B of the HE. For example, when the EHT MU PPDU is transmitted to multiple users, as illustrated in FIG. 30A, the EHT-SIG field may include the common field including the common control information and a user specifying field (or a user field) including control information dependent on a user. The common field may include U-SIG overflow, the total number of non-OFDMA users, and RU allocation subfield RUA. The common field may include resource unit allocation subfields respectively corresponding to sub-channels (for example, 20 MHz) included in a bandwidth. In addition, the RU allocation subfield may be omitted from the EHT MU PPDU set in the compression mode. A user specifying field for non-MU MIMO may include an STA-ID subfield, an MCS subfield, an $N_{STS}$ subfield, a Beamformed subfield, and a coding subfield and a user specifying field for MU-MIMO may include an STA-ID subfield, an MCS subfield, a coding subfield, and a spatial configuration subfield.

Referring to FIG. 30B, in an embodiment, the NDPA version subfield may include at least one bit corresponding to a major version and at least one bit corresponding to a minor version. For example, as illustrated in FIG. 30B, the NDPA version subfield may include an x-bit corresponding to the major version and a y-bit corresponding to the minor version (x and y are integers greater than 0). The major version may represent a protocol version in which requirements significantly change and the minor version may represent a protocol version in which requirements do not change significantly. For example, the major version may represent the VHT, the HE, the EHT, and the EHT+, the minor version may represent release of the above-described major version. In an embodiment, the NDPA version subfield includes bits respectively representing three or more hierarchical versions unlike in FIG. 30B.

Figure 31:
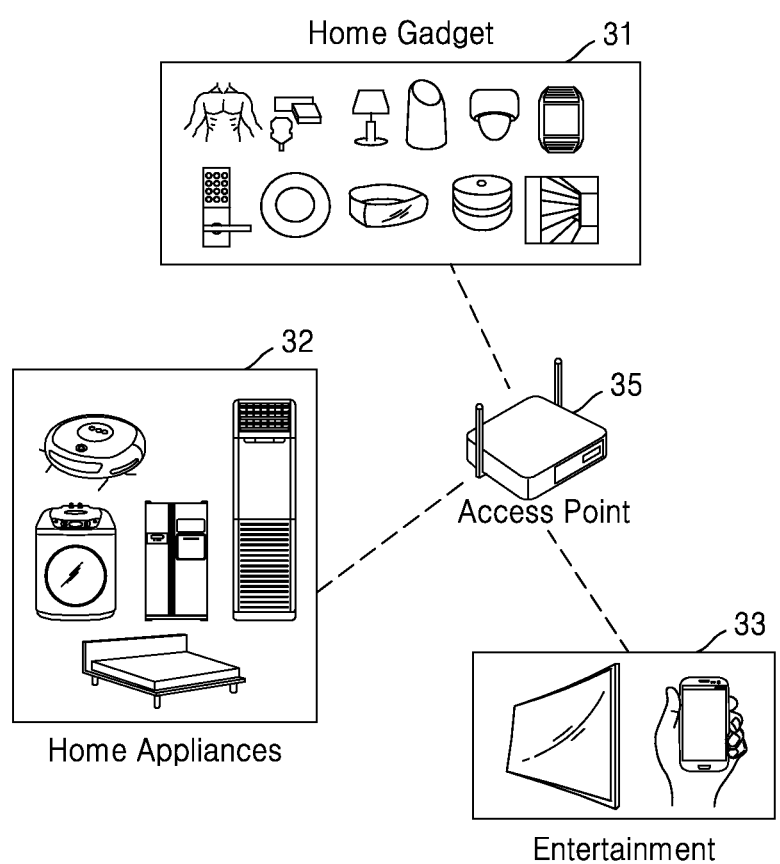
FIG. 31 is a view illustrating examples of a wireless communication device according to an exemplary embodiment of the inventive concept.

FIG. 31 is a view illustrating examples of a wireless communication device according to an exemplary embodiment of the inventive concept. Specifically, FIG. 31 represents an IoT network system including a home gadget 31, home appliances 32, an entertainment device 33, and an AP 35.

In an embodiment, communication based on the NDPA frame described above with reference to the drawings, for example, channel sounding may be performed by the wireless communication device of FIG. 31. The AP 35 may generate the enhanced NDPA frame and may transmit the PPDU including the NDPA frame to the home gadget 31, the home appliances 32, and the entertainment device 33. In addition, the home gadget 31, the home appliances 32, and/or the entertainment device 33 may provide the channel feedback information to the AP 35 based on the NDPA frame included in the PPDU received from the AP 35. Therefore, overhead for channel feedback may be reduced and the channel feedback may be correctly performed. As a result, efficiency of the IoT network system may increase.

While the inventive concept has been particularly shown and described with reference to embodiments thereof, it will be understood that various changes in form and details may be made therein without departing from the spirit and scope of the following claims.

What is claimed is:

1. A method of a second device communicating with a first device in a wireless local area network (WLAN) system, the method comprising:
   receiving, by the second device, a null data packet announcement (NDPA) frame from the first device, the NDPA frame comprising a medium access control (MAC) header and a frame body;
   extracting, by the second device, an NDPA version subfield from the frame body;
   identifying, by the second device, a protocol version based on the NDPA version subfield; and
   decoding, by the second device, the NDPA frame based on the protocol version,
   wherein the MAC header comprises a frame control field.

2. The method of claim 1, wherein the extracting of the NDPA version subfield further comprises:
   identifying a user information field corresponding to the second device from the frame body; and
   extracting the NDPA version subfield from the user information field.

3. The method of claim 2, wherein the identifying of the user information field further comprises identifying a disambiguation subfield set as '1' in the user information field.

4. The method of claim 1, wherein the extracting of the NDPA version subfield further comprises:
   identifying a common information field from the frame body; and
   extracting the NDPA version subfield from the common information field.

5. The method of claim 4, wherein the identifying of the common information field further comprises identifying an association identifier (AID) subfield set as a reserved value in a legacy protocol version in the common information field.

6. The method of claim 4, further comprising identifying a user information field corresponding to the second device from the frame body, wherein the identifying of the common information field further comprises identifying the common information field preceding the user information field in the frame body.

7. The method of claim 1, further comprising:
   receiving, by the second device, a null data packet (NDP) from the first device;
   receiving, the second device, a beamforming report poll (BFRP) trigger frame from the first device;
   generating, by the second device, feedback information based on the NDPA frame, the NDP, and the BFRP frame; and
   transmitting, by the second device, a frame including the feedback information to the first device.

8. The method of claim 1, wherein the receiving of the NDPA frame further comprises:
   receiving, by the second device, a physical layer protocol data unit (PPDU) from the first device; and
   extracting, by the second device, the NDPA frame from a payload of the PPDU.

9. A baseband circuit provided in a receiving device of a wireless local area network (WLAN) system, the baseband circuit comprising:
   a storage device;
   a controller for writing data to the storage device or reading data from the storage device;
   and a signal processor controlled by the controller and for decoding a physical layer protocol data unit (PPDU) received from a transmission device,
   wherein the PPDU comprises a preamble and payload, wherein a data field of the payload comprises a null data packet announcement (NDPA) frame, wherein the NDPA frame comprises a medium access control (MAC) header and a frame body, wherein the frame body comprises a first user information field applied to the receiving device, and wherein the first user information field comprises a partial bandwidth information subfield including subcarrier index information corresponding to a partial bandwidth designated as a channel feedback section of the receiving device and an additional partial bandwidth presence subfield indicating whether an additional partial bandwidth designated as the channel feedback section of the receiving device is provided in a bandwidth other than the partial bandwidth.

10. The baseband circuit of claim 9, wherein, when it is determined that the additional partial bandwidth designated as the channel feedback section of the receiving device is provided, wherein the frame body comprises a second user information field applied to the receiving device, and wherein the second user information field comprises a partial bandwidth information subfield including subcarrier index information corresponding to the additional partial bandwidth, an additional partial bandwidth presence subfield indicating whether the additional partial bandwidth designated as the channel feedback section of the receiving device is provided, and an identifier subfield having the same index as that of an identifier subfield of the first user information field.

11. The baseband circuit of claim 10, wherein first and last subcarrier index information items corresponding to the partial bandwidth are included in the partial bandwidth information subfield of the first user information field, and wherein first and last subcarrier index information items corresponding to the additional partial bandwidth are included in the partial bandwidth information subfield of the second user information field.

12. The baseband circuit of claim 10, wherein each of the additional partial bandwidth presence subfields of the first and second user information fields includes 1 bit.

13. The baseband circuit of claim 9, wherein, when it is determined that the additional partial bandwidth designated as the channel feedback section of the receiving device is provided, wherein the first user information field comprises an additional partial bandwidth information subfield including subcarrier index information corresponding to the additional partial bandwidth.

14. The baseband circuit of claim 13, wherein first and last subcarrier index information items corresponding to the partial bandwidth are included in the partial bandwidth information subfield, and wherein first and last subcarrier index information items corresponding to the additional partial bandwidth are included in the additional partial bandwidth information subfield.

15. The baseband circuit of claim 9, wherein the additional partial bandwidth presence subfield includes 1 bit.

16. A baseband circuit provided in a receiving device of a wireless local area network (WLAN) system, the baseband circuit comprising:
- a storage device;
- a controller for writing data to the storage device for reading data from the storage device; and
- a signal processor controlled by the controller and for decoding a physical layer protocol data unit (PPDU) received from a transmission device, wherein the PPDU comprises a preamble and payload, wherein a data field of the payload comprises a null data packet announcement (NDPA) frame, wherein the NDPA frame comprises a medium access control (MAC) header and a frame body,
- wherein the frame body comprises a user information field applied to the receiving device, and wherein the user information field comprises a resource unit (RU) allocation subfield including index information of an RU designated as a channel feedback section of the receiving device and information indicating to which band the channel feedback section of the receiving device belongs.

17. The baseband circuit of claim 16, wherein the index information of the RU indicates a size and position of the RU.

* * * * *